US 8,805,769 B2

(12) United States Patent
Ritter et al.

(10) Patent No.: US 8,805,769 B2
(45) Date of Patent: Aug. 12, 2014

(54) INFORMATION VALIDATION

(75) Inventors: Daniel Ritter, Heidelberg (DE);
Stephanie Rupprich, Mannheim (DE)

(73) Assignee: SAP AG, Walldorf (DE)

( * ) Notice: Subject to any disclaimer, the term of this patent is extended or adjusted under 35 U.S.C. 154(b) by 299 days.

(21) Appl. No.: 13/315,041

(22) Filed: Dec. 8, 2011

(65) Prior Publication Data

US 2013/0151463 A1 Jun. 13, 2013

(51) Int. Cl.
*G06F 17/00* (2006.01)
*G06N 7/00* (2006.01)
*G06N 7/08* (2006.01)

(52) U.S. Cl.
USPC .......................................................... 706/55

(58) Field of Classification Search
None
See application file for complete search history.

(56) References Cited

U.S. PATENT DOCUMENTS

| | | | | |
|---|---|---|---|---|
| 7,181,386 | B2 * | 2/2007 | Mohri et al. ...................... | 704/1 |
| 8,543,653 | B2 * | 9/2013 | Bhatt et al. ...................... | 709/206 |
| 8,655,989 | B2 * | 2/2014 | Ritter et al. ..................... | 709/220 |
| 2007/0112718 | A1 * | 5/2007 | Liu et al. .......................... | 706/47 |

OTHER PUBLICATIONS

U.S. Appl. No. 12/902,988, filed Oct. 12, 2010, Liebig et al.
U.S. Appl. No. 12/902,978, filed Oct. 12, 2010, Hoffman et al.
Communication and European Search Report received from EPO re Application No. 12008205.2 mailed Jan. 8, 2014; 8 pages.
Van Engelen, Robert A., "Constructing finite State Automata for high-performance XML Web Services", Proceeding sof the International Symposium on Web Services and Applications; vol. 2, Dec. 31, 2004 (XP002345119) 8 pages.
Da Luz et al., "Regular expression transformations to extend regular languages (with application to a Datalog XML schema validator)", Journal of Algorithms, Academic Press Inc., Orlando, FL, US, vol. 62, No. 3-4, Jul. 31, 2007, pp. 148-167 (XP022327980).
Doaa Soliman et al., "Verification and Validation of Safety Applications based on PLCopen Safety Function Blocks using Timed Automata in Uppaal", Control Engineering Special Section: DCDS '09—The 2nd IFAC Workshop on Dependable Control of Discrete Systems, vol. 19, No. 9, Sep. 30, 2011, pp. 929-946, (XP055094386); Retrieved from Internet: URL: http://www.aut.uni-saarland.de/uploads/media/FG_DS_DCDS_jun_2009.pdf [retrieved on Dec. 19, 2013].
Birte Glimm et al. "Deciding SHOQ [square intersection] Knowledge Base Consistency using Alternating Automata", Description Logics, vol. 353 of CEUR Workshop Proceedings, CEUR-WS.org., Dec. 31, 2008; 12 pages (XP055094394); Retrieved from Internate: URL:http://ceur-ws.org/Vol-353/GlimmHorrocksSattler.pdf [retrieved on Dec. 19, 2013].
Nazir Ahmad Zafar et al., "Construction of Intersection of Nondeterministic Finite Automate Using Z Notation", International Journal of Computer Science, Dec. 31, 2008; 6 pages; (XP055094391); Retrieved from Internet: URL: http://citeseerx.ist.psu.edu/viewdoc/download?doi=10.1.1.193.2823&rep=rep1&type=pdf [retrieved on Dec. 19, 2013].

* cited by examiner

*Primary Examiner* — Michael B Holmes
(74) *Attorney, Agent, or Firm* — Fish & Richardson P.C.

(57) ABSTRACT

A computer implemented method for knowledge validation includes identifying a fact for validation. A semantic model representing the fact for validation can be created. A context associated with the fact can be identified, and an automaton can be created based at least in part on the identified context. The fact can be validated using the automaton.

20 Claims, 23 Drawing Sheets

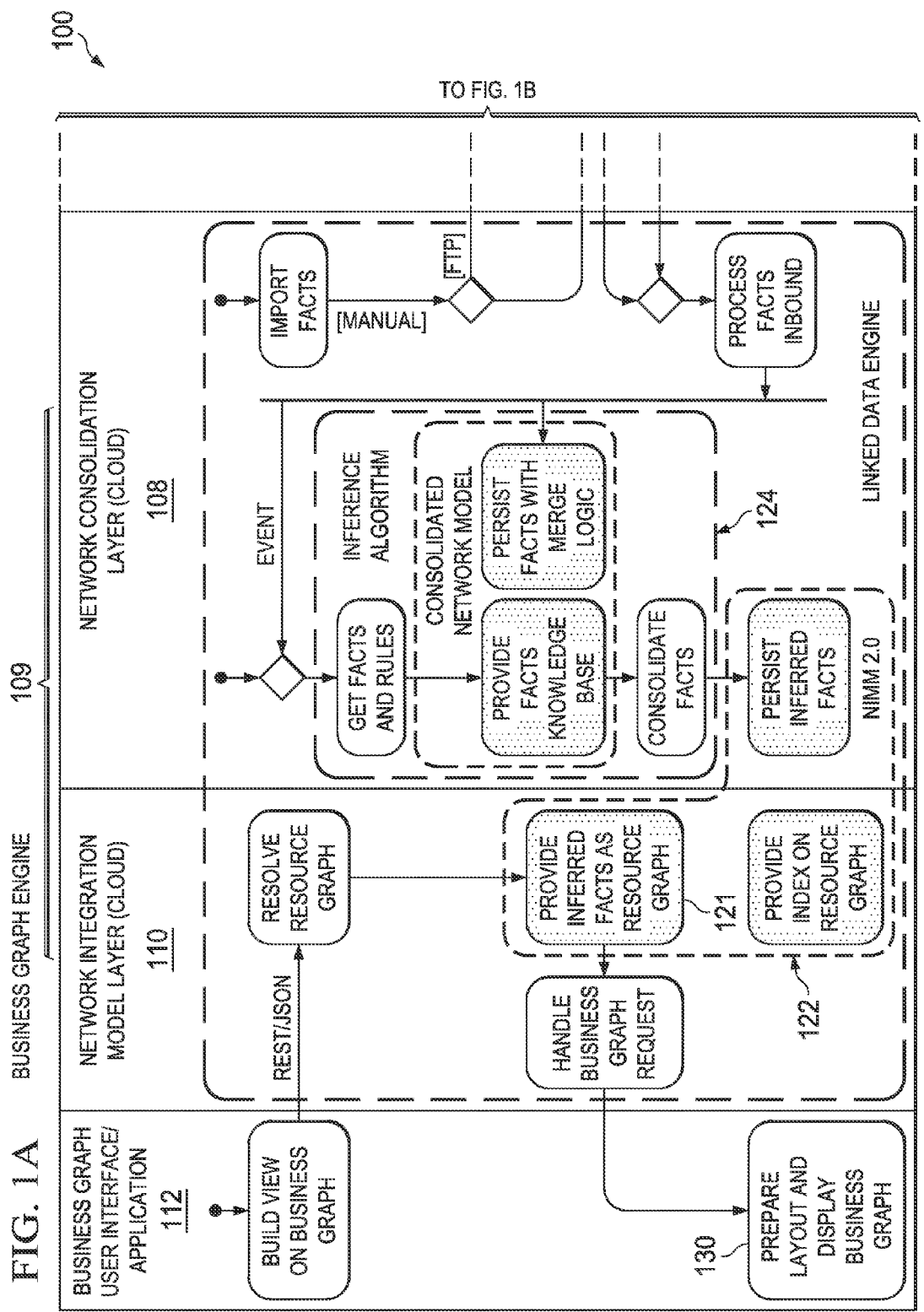

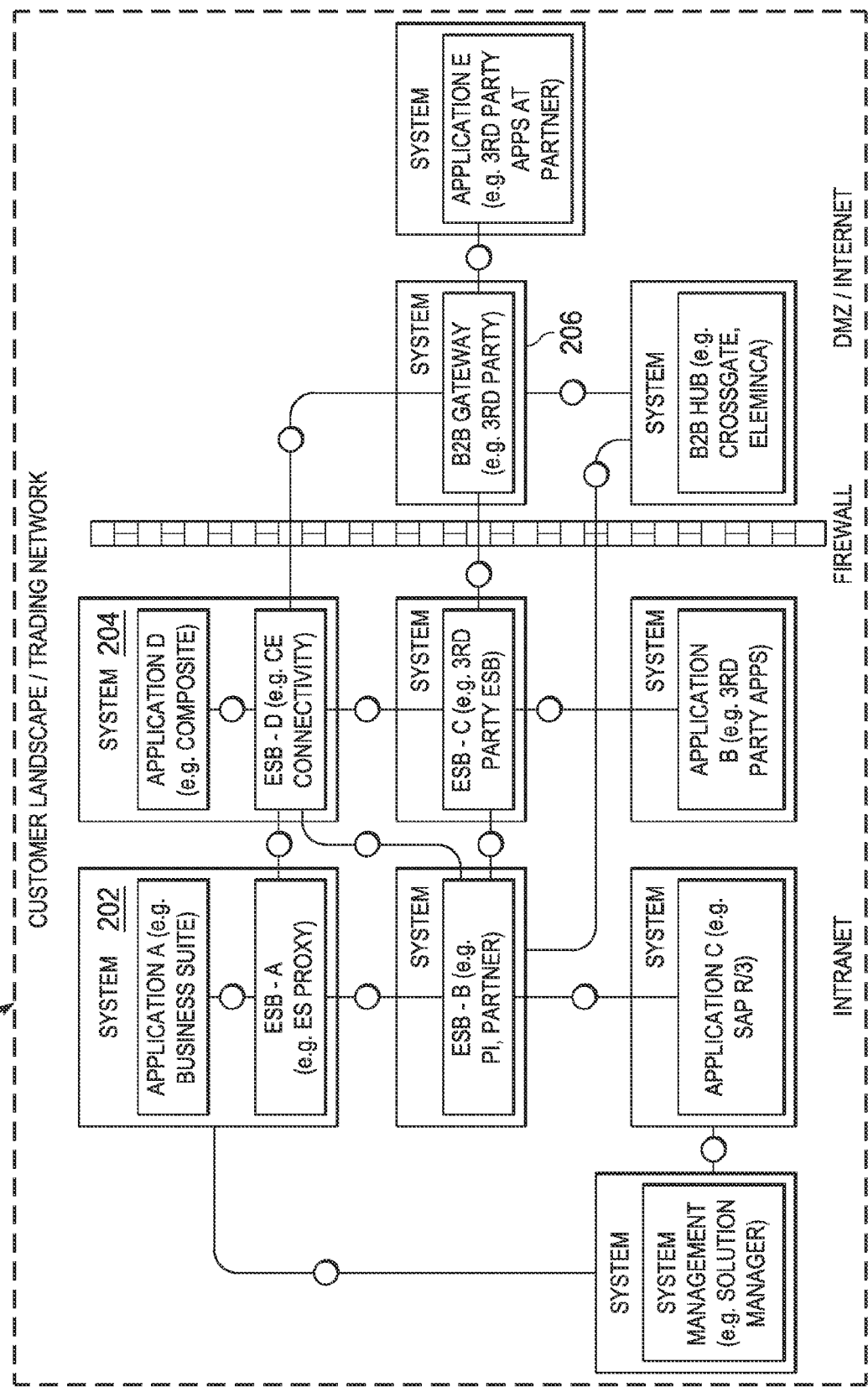

US 8,805,769 B2

INFORMATION VALIDATION

TECHNICAL FIELD

This invention relates to information validation, and more particularly to content-based knowledge validation using, for example, deterministic finite automata.

BACKGROUND

Structured data can be used to graphically display the information to a user or used for programmatically processing. Invalid information, which may come from different sources, may compromise the quality of structured data. Validation of the information may preserve the quality of structured data according to its model, e.g., consolidated model in the business trading network domain.

SUMMARY

In general, this disclosure pertains to content-based validation of knowledge (structured data). It includes the validation of the content of the detected and injected knowledge, as well as its conformance with a given model, e.g. the Consolidated Model. The validation includes the validation of (user defined) dependencies of the knowledge. This disclosure describes a design and implementation of a system, method, and computer program product that validates the knowledge shown for the trading web of an enterprise according to the Consolidated Model.

In certain embodiments, a computer-implemented method for knowledge validation may include identifying a fact for validation. A semantic model may be created, the semantic model representing the fact for validation. A context associated with the fact may be identified, and an automaton can be created based at least in part on the identified context. The fact can be validated using the automaton.

In certain embodiments, a computer program product for knowledge validation may be stored on a tangible, non-transitory media, operable to execute instructions that can include identifying a fact for validation. A semantic model may be created, the semantic model representing the fact for validation. A context associated with the fact may be identified, and an automaton can be created based at least in part on the identified context. The fact can be validated using the automaton Certain implementations of the embodiments can also include identifying a consolidated model. The consolidated model can include information about business trading networks within and between companies. The fact for validation may be associated with the consolidated model.

In certain implementations of the embodiments, the automaton is a deterministic finite automaton. The deterministic finite automaton may be derived from an epsilon non-deterministic finite automaton. The deterministic finite automaton may be defined by one or more of a state, an input symbol, a transition function, a starting state, and a final state. The final state can be an accepting state, and the automaton can enter the accepting state after successfully validating the fact.

In certain implementations of the embodiments, the automaton is created based, at least in part on, the semantic model.

In certain implementations of the embodiments, the semantic model further represents fact dependencies associated with the fact.

In certain implementations of the embodiments, the fact to be validated may be a subset of the context.

In certain implementations of the embodiments, creating an automaton based at least in part on the identified context may include creating an automaton for each instance of a model entity.

In certain implementations of the embodiments, the fact may be a Datalog fact.

In certain implementations of the embodiments, the fact may be one or more of a fact, knowledge, or data.

Certain implementations of the embodiments can also include providing a runtime graphical output identifying error states.

Certain implementations of the embodiments can also include providing a runtime textual log output identifying errors.

In certain implementations of the embodiments, validating the fact using the automaton can include validating one or more of structure or content of structured data.

In certain implementations of the embodiments, a domain specific language may be used for a programming model to specify a validation program.

In certain implementations of the embodiments, a validation program can be generated from the semantic model. The semantic model may be in a domain specific language, and the automaton can be generated at runtime from the semantic model. The automaton can be generated automatically by an intelligent algorithm.

In certain implementations of the embodiments, the fact is a fact in a consolidation model, the consolidation model subject to validation by the automaton.

The systems, methods, and computer program products described here in apply to the quality of structured data in different dimensions (structure, content, etc). This disclosure provides an automatic but configurable structure and content validation of structured data. A Domain Specific Language (DSL) or fluent Application Programming Interface (API) can be used for a programming model to specify a validation program. The validation program is generated from, for example, the DSL, and is called a semantic model. From the semantic model, a runtime model is generated, for example, as an automaton. In certain implementations, the automaton is automatically generated by intelligent algorithm. The runtime model is able to run different evaluation procedures such as top-down, bottom-up or random evaluation of the validation program.

The approach described herein is designed for efficient storage and loading of data, parallel processing of validation programs, as well as shared memory computing (e.g., concurrency for validation programs defined).

The approach is applicable for the validation of facts, which may be a part of a Datalog program. Datalog facts are structured and thus applicable to the disclosure. The techniques described herein are also applicable to complex fact models, e.g., the consolidation model described herein, and the techniques described herein can be used to validate facts for that domain (e.g., model-based validations).

The validation programs are debuggable to make the validation programming model usable as any other programming language. Debugging can be facilitated by graphical and textual outputs for real-time debugging.

This disclosure provides for defining a configurable but automatic validation schema as a programming model in the area of regular and context sensitive languages. It allows for domain-specific data quality and allows for various kinds of checks, such as value lists, structural, etc. Validation programs can be written by persons of varying degrees of knowledge in programming.

States apply to operators of a validation program. These states can be self-defined and thus the techniques described herein can be extended by custom validation operations, such as filter states, length checks, starts with or ends with checks for strings, boundary checks for numeric types, etc.

The details of one or more embodiments of the invention are set forth in the accompanying drawings and the description below. Other features, objects, and advantages of the invention will be apparent from the description and drawings, and from the claims.

DESCRIPTION OF FIGURES

FIGS. 1A-1B are activity diagrams of the Business Graph Engine.

FIG. 2 is a schematic representation of an example trading network landscape.

DESCRIPTION OF TABLES

Figure 5:
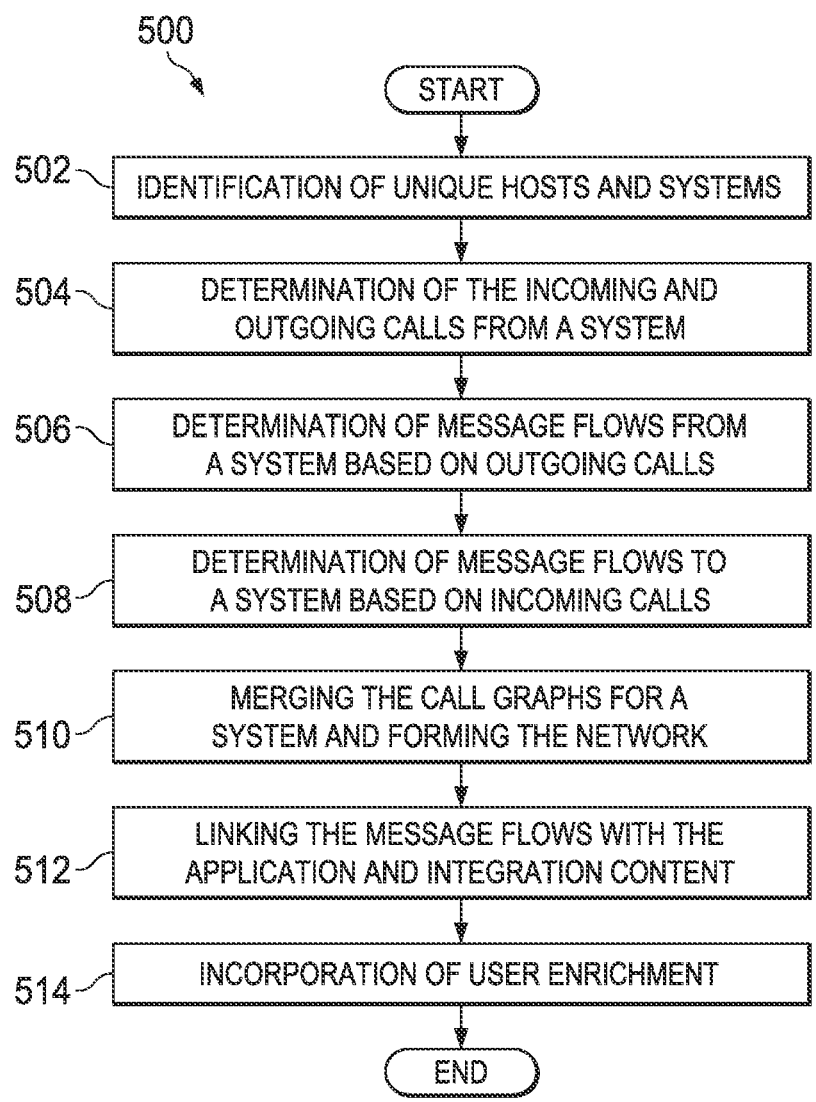
FIG. 5 is a process flow diagram of an example consolidation algorithm.

Table 1 is an extract of an example of discovered facts used in the consolidation algorithm of FIG. 5.

Table 2 is an extract of discovered facts in an example extended consolidated model.

DESCRIPTION OF ALGORITHMS

Algorithm 1 is an example algorithm for determining the state list for a fact.

Algorithm 2 is an example algorithm for determining the level of a fact model.

Algorithm 3 is an example algorithm for preprocessing for fact validation.

Algorithm 4 is an example algorithm for determining a next state for the automaton.

Algorithm 5 is an example algorithm for validation of a fact.

Algorithm 6 is an example algorithm for fact validation post-processing.

Algorithm 7 is an example algorithm for a fact validation transition function.

Algorithm 8 is an example algorithm for determining dependency facts of an argument.

Algorithm 9 is an example algorithm for determining a return state for a fact validation transition function.

DESCRIPTION OF LISTINGS

Listing 1 is an example excerpt from a definition file.

Listing 2 is an example textual output of the automaton for a valid data fact.

Listing 3 is an example description of a dot graph for a valid data fact.

Listing 4 is an example definition file for a runs_on fact with an invalid system fact.

Listing 5 is an example textual output of an automaton for a runs_on fact with an invalid system fact.

Listing 6 is an example definition file for a runs_on fact with a corresponding system Fact and no data Fact.

Listing 7 is an example textual output of the automaton for a runs_on fact with an invalid system fact.

Listing 8 is an example textual output of the automaton for an invalid runs_on fact.

Listing 9 is an example definition file for a valid runs_on fact.

Listing 10 is an example textual output of the automaton for a valid runs_on fact.

Like reference symbols in the various drawings indicate like elements. The algorithms and code listings described in this disclosure are meant to illustrate examples. Other algorithms and code not shown here may be applicable

DETAILED DESCRIPTION

Subsequently the example domain (Business Trading Web) is discussed to which the subject matter disclosed herein can be applied. It is understood, however, that the subject matter is not limited only to that domain. For example, the subject matter described herein can be used for any structured data, including that associated with the consolidation model described below. In addition, the subject matter described herein is applicable for other domains, such as input to deductive systems, data quality validation for linked data community, process mining, etc.

The Business Trading Web is a software developed by SAP AG that graphically gives a central overview of the trading networks of enterprises. In order to do this, information about the customer landscape is collected, consolidated and stored in a model, whose logical knowledge representation is implemented in Datalog. As users can affect the injection of facts by developing their own data extractors and processors, the facts have to be validated according to their content and interdependencies to ensure a consistent knowledge base. To tackle this issue, a programming model, based on Deterministic Finite Automata, has been developed. It allows to generically process knowledge encoded in Datalog and it empowers custom extensions to the validation logic.

This disclosure discusses different methods of content-based fact validation and gives a detailed description on the concept, implementation and programming model of the fact validation using Deterministic Finite Automata. The implemented Fact Validation Automaton (FVA) facilitates the distributed validation of facts in a given context using different validation strategies. The validation can be manipulated by the definition of the structure of the facts using a domain-specific language. Moreover, for the FVA, custom states containing validation logic can be implemented. Furthermore, this disclosure describes the application of the developed FVA in the context of the Business Trading Web. It evaluates different root causes in this context and shows performance measurements for different validation strategies. Additionally, there is some guidance on debugging, i.e., analyzing the reason for a fact being invalid.

Enterprises manage their knowledge, which does not only include the skills and competencies of the employees, but also information about the variety of business networks that the enterprise participates in. However, independent of the amount of knowledge that is collected and managed, the benefits of the knowledge are only as good as its quality. The knowledge has to be consistent, thus it needs to be validated.

The Business Trading Web is a software that collects information about business trading networks within and between companies and stores them in a model (called the Consolidated Model) in order to graphically display them to the user. However, as there are different causes of invalid information (e.g., the possibility for users to inject facts manually), the information has to be validated in order to preserve the quality of the knowledge about the business trading networks. Therefore, the main topic of this thesis is the content-based validation of knowledge. It includes the validation of the content of the detected and injected knowledge as well as its conformance with the predefined Consolidated Model. This includes the validation of possible dependencies of the knowledge. However, this research does not include the validation of the Consolidated Model itself in terms of completeness or consistency.

Enterprises have large business trading networks that execute their business processes in a non-central controlled way. Business trading webs are formed by different kinds of business networks, resulting from contracts, virtual organizations, subcontracting, franchising, joint ventures, holding organizations and others. Until now, there is no way to gain a central overview, neither within the enterprise nor between enterprises. It is very complex to outline a network that results from the Business to Business (B2B) processes between enterprises, which are processes of selling a good or service to another enterprise.

That means, if different information technology, middleware, and applications have to be managed, this can only be done with big effort. For example, the knowledge about the "as-is" network has to be gathered from domain experts or documentation, if available. Middleware can be considered as an abstract software layer that enables the platform-independent communication between application systems and data sources without regard to the used programming language and communication protocol.

Therefore, the Business Trading Web is being developed. Its aim is to precisely and explicitly express a company's business trading web. Thus, it makes the B2B relations of a networked enterprise visible and eases the end-to-end life-cycle behind integration developments as well as applications and allows collaboration on different interlinked information for faster execution. In order to do this, the Business Trading Web facilitates an automatic generation of the "as-is" network from real instances of business, social and integration artifacts. It also enables different people to collaborate on the definition of the "to-be" aspects on the inferred network. This can possibly be done blueprint-based, which means that the "to-be" network is newly created, for example as Event-driven Process Chains (EPC) or white-board drawings, without using the already existing "as-is" aspects. Furthermore, they can contextualize and enrich the inferred network with business semantics (e.g., business tags or document entities). In addition to that, it is possible to define policies and Service Level Agreements (SLA), which are contracts about the cost, price and aims, service level and the quality of a running system as well as the procedures if the agreements are not fulfilled. It is also possible to write back changes into the original data sources. The network can be monitored for business and integration exceptions or events, which can be resolved collaboratively at any time.

The benefits of Business Trading Web include trading web visibility, partner onboarding, business exception management and contract determination. All of the features can be done in the context of the customer's own trading web.

Figure 1B:
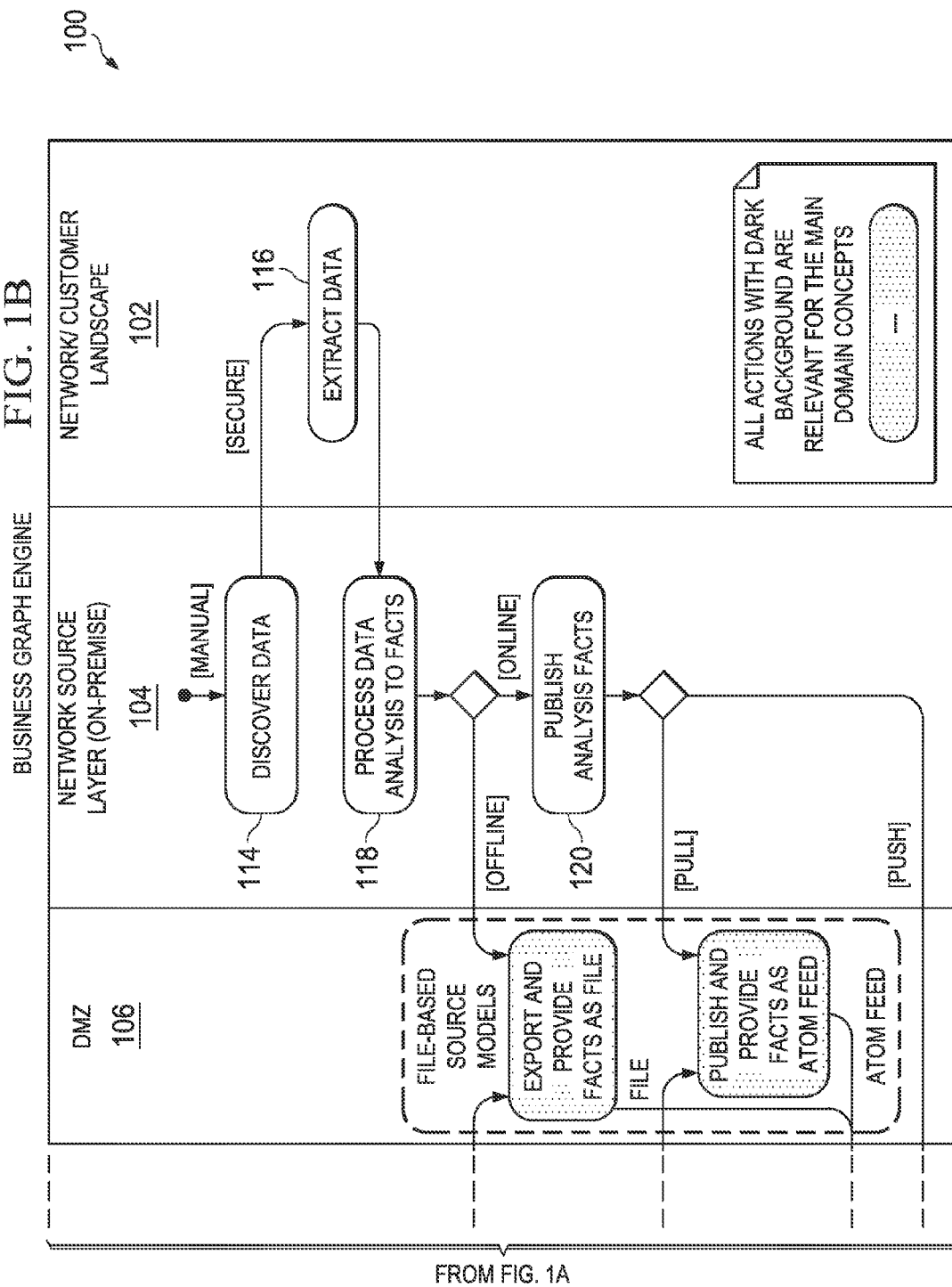

The creation of the business network graph, which is shown in FIGS. 1A-1B, is facilitated by different layers. FIGS. 1A-1B are activity diagrams 100 of the Business Graph Engine. There are different layers involved in the creation of the business network graph. The lowest layer, Network/Customer Landscape layer 102, where the information about the business trading web is extracted, is on the right side. The highest layer, Business Graph User Interface/Application 112, where the graph is displayed, is on the left side of FIGS. 1A-1B. The Network Source Layer 104 searches for sources in the Network/Customer Landscape 102. Certain Domain Analysis components, which are part of the Network Source Layer 104 and contain domain-specific knowledge to read and process the information from the systems, get the data from the source systems using a Connector Infrastructure. A Connector communicates with the systems in this landscape, for example via Hypertext Transfer Protocol (HTTP) or Enterprise Services, and loads the information about them. For example, a Discover Data component 114 connects to an Extract Data component 116 over a secure channel. Extract Data 116 is connected to Process Data Analysis to Facts 118, where the information is stored in the form of facts. The next step is to provide the facts via an exported file or a published atom feed (Publish Analysis Facts 120) to the Network Consolidation Layer 108. This is done in the Demilitarized Zone (DMZ) 106, which generally is a subnet in a computer network that allows access to servers that need to be reached from outside the intranet without allowing the access to it. In the context of the Business Graph Engine 100, the facts may be accessed from the Network Consolidation Layer 108, which may be in the Cloud, which means it is not installed on the client's computer. The facts are extracted, however, from the Network/Customer Landscape layer 102. In order to separate these two layers, there is a DMZ 106. The Linked Data Engine 109, which consists of the Network Integration Model Layer 110 and the Network Consolidation Layer 108, uses the preprocessed facts out of the DMZ 106 and the corresponding rules to consolidate the facts using an inference algorithm 124.

The inference algorithm 124 includes a consolidation process. The consolidation includes the discovered data and also the information that has already been stored in the knowledge base. During consolidation, the information about the systems is translated into a common format (e.g., like that of the Consolidated Model). This model will be explained further below. After consolidation, the Consolidated Model is persisted. The next step is to transform the Consolidated Model into a Network Integration Meta-Model (NIMM) resource graph 121. The NIMM model 122 is an extension and specialization of Business Process Modeling Notation (BPMN) 2.0, which is a graphical standard to model business processes within and across companies. Therefore, the NIMM 122 describes different entities and their relationships within and across companies. This is done in the Network Integration Model Layer 110. Finally, in the Business Graph User Interface/Application 112, the business graph can be resolved and displayed 130 on the user interface.

The Business Graph is a graph that consists of different enterprises and people, but also networks of systems and applications that collaborate with each other. Generally, Business Graphs of large enterprises are composed of two networks: one network of applications and middleware for internal processes and another one for external processes used for the interaction with business partners (e.g., suppliers, carriers, or dealers). Even though it might not be obvious, a huge amount of data in Enterprise Resource Planning (ERP) systems comes from outside of networked enterprises. The cause of this is, that in reality, Business to Business (B2B) processes are often implemented as a transactional exchange of documents with business partners in order to do business more collaboratively. This leads to a linked-data architecture style in the context of partner networks and relationships. Therefore, there is a strong need for orchestrating processes across multiple enterprises. Orchestration is the description of executable business processes and their interaction with internal and external web services as well as their interaction. A generalized view, which combines connectivity, business and social aspects, can be described as a Linked Business Graph.

A typical traditional technical network is shown in FIG. 2. FIG. 2 is a schematic representation of an example trading network landscape 200. FIG. 2 shows an excerpt of a more integration-oriented business trading network that consists of systems in the Intra- and Internet. On these systems, there are different applications and middleware running and interacting with each other. For example, System A 202 includes Application A and Enterprise Service Bus (ESB)-A, which may be an Enterprise Service (ES) proxy, which is a web-service-based application proxy, which is of the category of system embedded integration. Systems connected in the Intranet may communicate with each other, or may communicate with Systems in the DMZ or across the Internet. For example, System D 204 communicates across a firewall with System 206, which in this case is a B2B Gateway. This customer landscape might be implemented by integration consultants and architects and it may be administrated by IT-operations and administration persona. At this point of time, a general view of the complete network can only be accomplished by gathering the integration knowledge in the enterprise. Furthermore, this business trading web is implicit, which means it only shows the systems and the relationships between them. However, the enterprises in a business trading web play different roles (e.g., customer or vendor) depending on the type of business partner interaction. This information and the corresponding semantics are hidden in master data, business processes and domain specific configurations.

Figure 3:
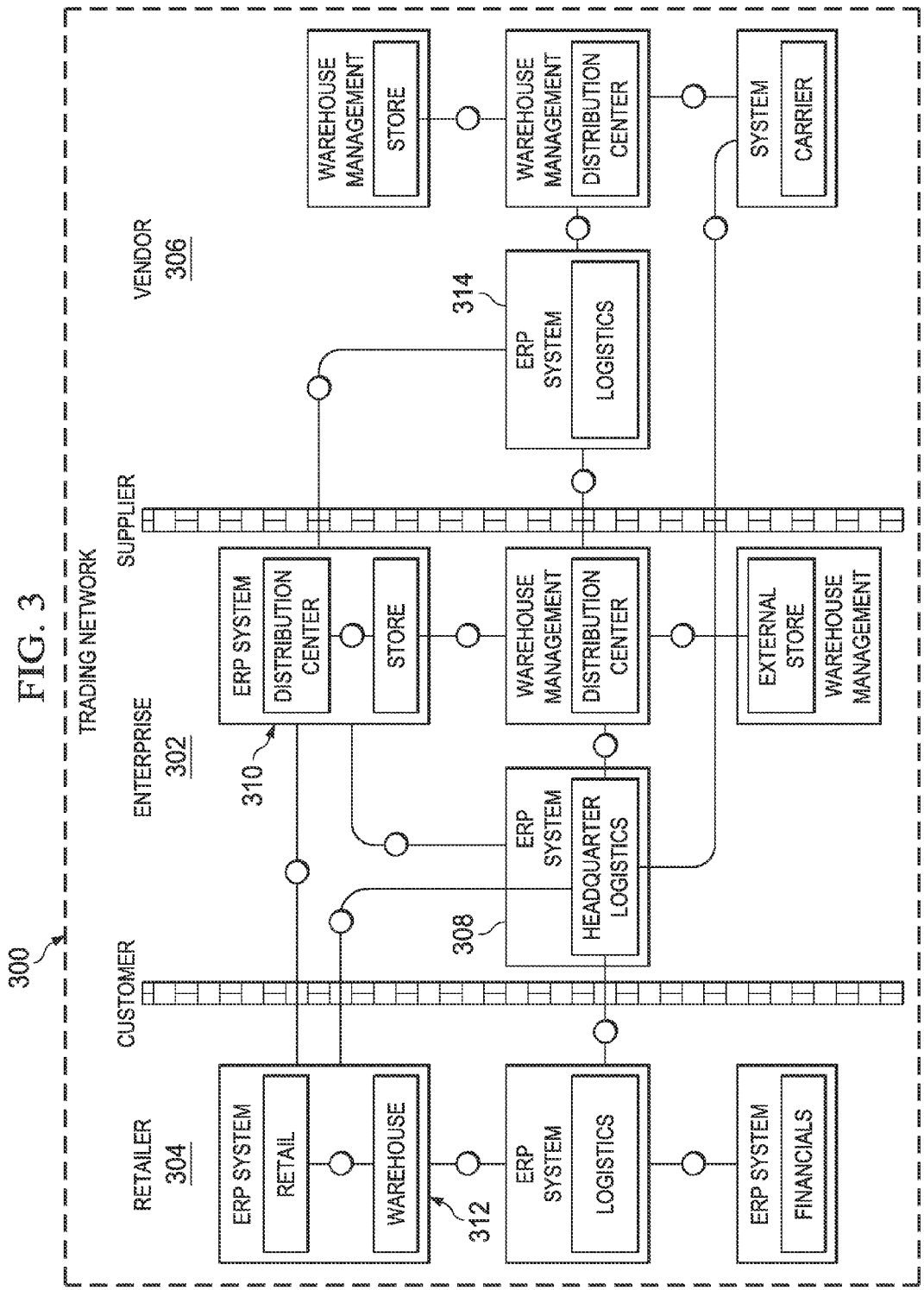
FIG. 3 is a schematic of an example business trading web landscape.

FIG. 3 is a schematic of an example business trading web landscape 300. This network includes an enterprise 302 and its business partners (retailer 304 and vendor 306). Goods may be held in warehouses, and ERP logistic systems 308 connect different distribution centers 310. Distribution center 310 connects with business partners through other ERP systems, such as ERP System Retail 312 and Logistics 314. The business trading web landscape 300 in FIG. 3 consists of business and power users that maintain the relationships and dependencies within their own and across enterprises. In order to do their daily work, they need specific knowledge in different business domains as well as frequent communication with the other domains. Under these circumstances, they will be able to gain an overview on the business relationships.

The Linked Business Graph, which the user looks at on his screen, is based on a model: the Consolidated Model. As mentioned above, a first raw form of the Consolidated Model is formed by adopting the domain-specific information gathered by the Network Analysis. Using this raw data, the consolidated network, which is a view on the network across different application and integration systems as well as business aspects, is determined by the consolidation mechanism. The mechanism contains just the amount of information to fulfill this task.

Figure 4:
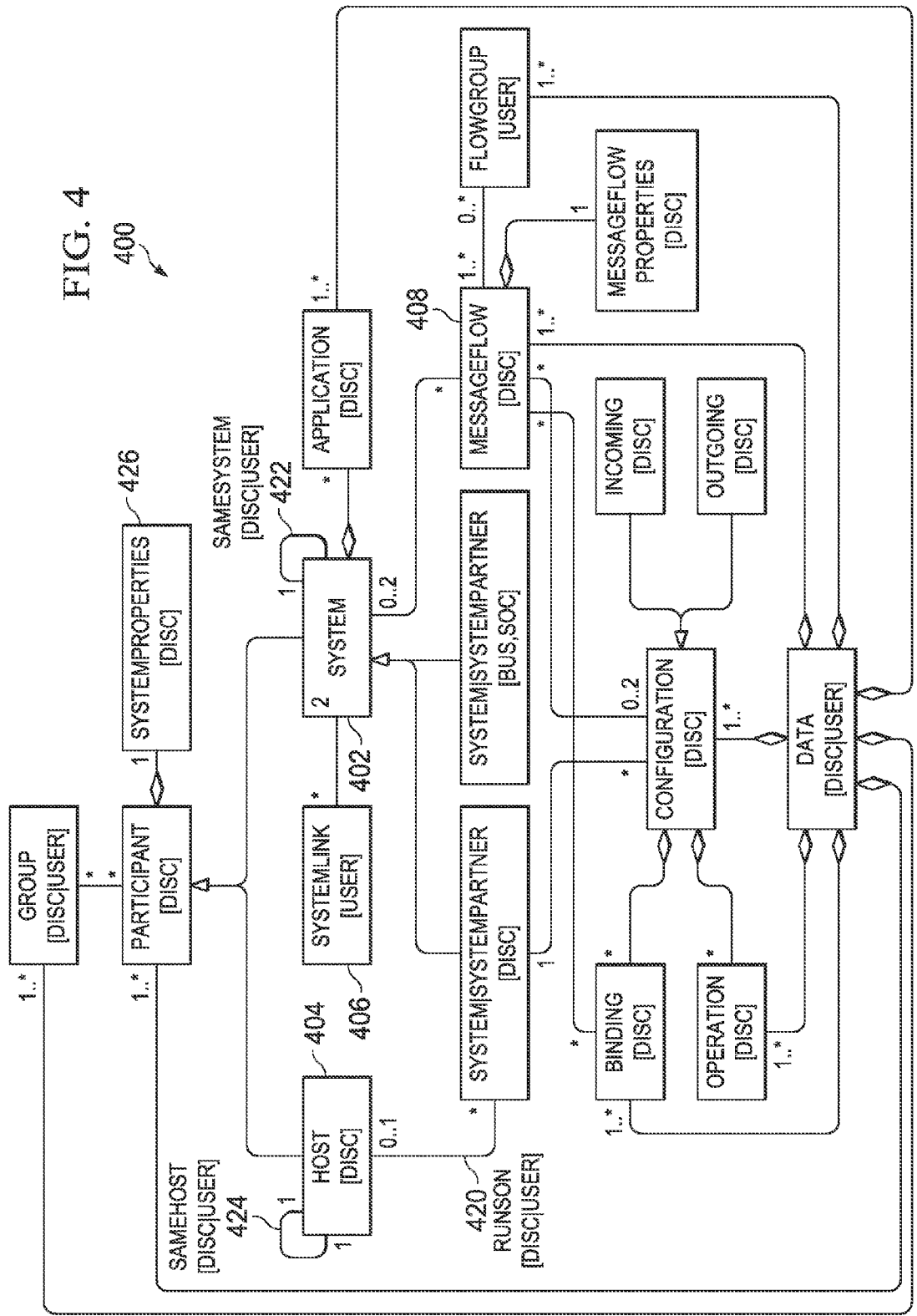
FIG. 4 is a schematic representation of a Consolidated Network Model.

The structure of the Consolidated Model is shown in FIG. 4. FIG. 4 is a schematic representation of a Consolidated Network Model 400. This model shows the main participants and relationships of a Business Trading Web. FIG. 4 illustrates certain participants within business networks. The main participants are systems (e.g., system 402 and hosts 404). A system is a logical entity that can be assigned to a physical entity (i.e., host) using the runsOn semantic. The relationship between two systems can be defined by MessageFlows 408 or SystemLinks 406. Furthermore, a MessageFlow 408, which represents an exchange of messages between two participants, may also exist between a system and a configuration or between two configurations. Configurations belong to systems and describe technical or business information about a relation between systems. There are two types of configurations: incoming configurations, which indicate incoming MessageFlows, and outgoing configurations, which express outgoing MessageFlows.

One important characteristic of the Consolidated Model is that all entities except the semantics runsOn 420, sameSystem 422, and sameHost 424 and the systemProperties 426 fact are linked to a data entity, which contains technical information about them, e.g., their URI. Consequently, there has to exist one data entity that matches the corresponding entity.

In general, the idea is to represent a physical host as Participant and afterwards find the interfaces provided or called by this hosts and the systems running on it. Different kinds of systems have different applications and integration logic running on them. For the consolidation, integration logic and business entities are unified by the term system. The brackets [ ] in FIG. 4 indicate the type of analysis and discovery of the data: [user] means the information was injected by a user, while [bus] or [disc] mean business or integration-related data.

The discovered information that the Consolidated Model deals with, is formalized using facts (such as Datalog facts). Datalog is one kind of the representation of knowledge using first-order logic. That is, it is a language that expresses operations on relations using Horn clauses. In general, a clause is the sum of an amount of literals. A literal is an atomic formula or a negated atomic formula. One part of an atomic formula is the predicate symbol p. As each atomic formula has one predicate, the first-order logic is also called predicate logic. The other part of the atomic formula is a list of arguments ($q_i$). Therefore, it can be noted in the following way:

$$p(q_1, q_2, \ldots, q_i).$$

In general, a Horn clause is a clause that has, at most, one positive literal. There are different kinds of Horn clauses:

If the Horn clause only consists of one single positive literal, it is called fact. Facts do not only consist of a predicate and a list of arguments, they also have an arity k. The expression $p^k$ means that k is the arity of the fact with the predicate p. For example, a system in the Consolidated Model is described by the following fact:

$$system\_discx(name, description, systemURI)$$

As this fact has three arguments, its arity is k=3, or system 3. When a fact is stored in the database, this is called Extensional Database (EDB). This is the way the Consolidated Model is represented.

A Horn clause that is composed of one or more negative literals is defined as an integrity constraint.

If there is one positive literal and one or more negative literals, the Horn clause is called rule. A rule consists of a head h, and a body, which looks similar to the expression $p_1 \wedge p_2 \wedge \ldots \wedge p_i$. Each of the $p_i$ is called a subgoal. The complete rule would be:

$h:-p_1 \wedge p_2 \wedge \ldots \wedge p_i$.

This rule means that if $p_1$ and $p_2$ and ... and $p_i$ are true, then h is true. The storage of rules in the knowledge base is called Intentional Database (IDB).

Furthermore, a collection of Horn clauses is called logic program. This program is executed by a Datalog engine which applies logical inference on the facts and rules. The Business Trading Web engine uses a special Consolidation Algorithm to do so. It is coordinated and executed by the Consolidator, which delegates large parts of the analysis to specific Explore and Analyze components that interact with the specific source models. Therefore, the Consolidator is able to stay independent from the source models of different systems.

As aforementioned, the Consolidation Algorithm is described as a set of rules (e.g., Datalog rules), which are used to derive new facts from the discovered ones. All facts that are processed by the Consolidation Algorithm are explained in Tables 1 and 2. Table 1 is an extract of an example of discovered facts used in the consolidation algorithm of FIG. 5. The table shows a selection of discovered facts, their meaning and in which step of the Consolidation Algorithm they were discovered.

TABLE 1

Extract of the Discovered Facts Used in the Consolidation Algorithm

| Step | Fact | Meaning |
|---|---|---|
| 1 | host_discx(name, description, hostURI) | relates a name to the unique URI of a host. It may also contain a description of the host. |
| 1 | same host_discx(hostURI1, hostURI2) | defines an equivalence relation on two hosts. |
| 1 | system_discx(name, description, systemURI) | relates a name to the unique URI of a system. It may also contain a description of the system. |
| 1 | same system_discx(systemURI(1), systemURI(2)) | defines an equivalence relation on two systems. |
| 1 | runs_on_discx(systemURI, hostURI) | connects a system to the host it runs on. |
| 2 | incoming_discx(systemURI, interfaceName, interfaceNamespace, congURI) | relates the URI of a system to a congURI which may be used to find more information about the incoming call configuration of a system. It also contains the name of the interface used. The namespace of the interface is optional. |
| 2 | outgoing_discx(systemURI, interfaceName, interfaceNamespace, congURI) | relates the URI of a system to a congURI which may be used to find more information about the outgoing call configuration of a system. It also contains the name of the interface used. The namespace of the interface is optional. |
| 3 | message flow_discx(senderURI, receiverURI, messageFlowURI) | relates the URI of a sender and a receiver to the messageFlowURI, which may be used to find more information about the messageFlow. A sender can be either a system or an outgoing call configuration while a receiver can be either a system or an incoming call configuration. |

Table 2 is an extract of discovered facts in an example extended consolidated model. The table shows a selection of discovered facts and their meaning in the Extended Consolidated Model.

TABLE 2

Extract of the Discovered Facts in the Extended Consolidated Model

| Fact | Meaning |
|---|---|
| binding_discx(congURI, transport,messageProtocol, bindingURI) | relates the URI of a configuration to a bindingURI, which may be used to find more information about the binding. It may also contain the transport and message protocols used. |

TABLE 2-continued

Extract of the Discovered Facts in the Extended Consolidated Model

| Fact | Meaning |
| --- | --- |
| operation_discx(congURI, operationName, message, operationURI | relates the URI of a configuration with an operationURI, which may be used to nd more information about the operation. I may also contain the name of the operation and the message protocol. |
| application_discx(systemURI, applicationName, version, applicationURI) | relates the URI of an application running on a system to the URI of the system. It may also contain the application name and its version. |

An overview of the Consolidation Algorithm is shown in FIG. 5. FIG. 5 is a process flow diagram of an example consolidation algorithm. The steps of the algorithm may be performed in a specific order to ensure that the relevant information is discovered. The first step of the Consolidation Algorithm is the identification of unique hosts and systems 502. As mentioned above, the network is based on hosts running in the customer landscape. Hosts are usually identified by name, Internet Protocol (IP) address, etc. The systems, which are the logical identities that run on the hosts, only have context-dependent identifiers. In contrast to hosts, there is no universally applicable identification scheme for systems. As a result, the information about the hosts and systems is gathered from different sources and stored in source-specific source models first. This happens in the Network Source Layer. In order to create a single unified model (the Consolidated Model), a list of unique systems and hosts has to be compiled.

As mentioned above, the problem is that there is no universal identification scheme. For example, over time, different Domain Name System (DNS) names can be used for a host with a specific IP address, and vice versa. To solve this problem, equivalence classes are created over the set of all possible identifiers. One equivalence class contains all identifiers that are known to identify the same system or host. As at least one element of an equivalence class does not change when the others change, the identification of hosts and systems can be maintained over long periods of time while there is a constant but gradual change. The process of adding new and removing outdated information is continuous. Consequently, the way of determining which information is relevant and which is outdated is done by adding a timestamp to each piece of discovered information.

Figure 6:
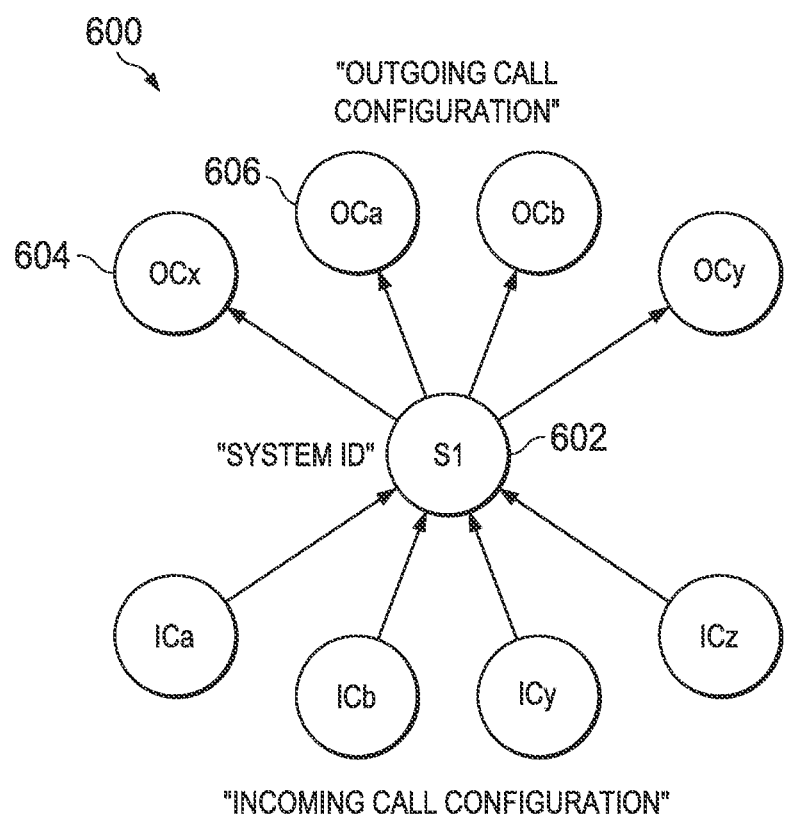
FIG. 6 is a schematic representation of an outgoing call graph for a system.

Then, the determination of the incoming and outgoing calls from a system is performed 504. Using the source models, it is possible to determine incoming and outgoing calls between different systems. It is assumed that on one hand, there is an incoming call configuration for most of the incoming calls to a system (but probably not for all). On the other hand, there should be an outgoing call configuration for most outgoing calls of a system. However, for some cases, such as Remote Function Calls (RFC), where a function of a system is called by another system, there are no incoming call configuration required other than the function that is being used remotely. Therefore, no configuration can be detected. The result of this step should be an outgoing and incoming call graph for a system with a particular identifier, such as shown in FIG. 6. FIG. 6 is a schematic representation of an outgoing call graph for a system 600. The uniquely identified system $S_1$ 602 has different outgoing call configurations (e.g., OCx 604, OCa 606), which directly or indirectly connect it to other systems.

Figure 7:
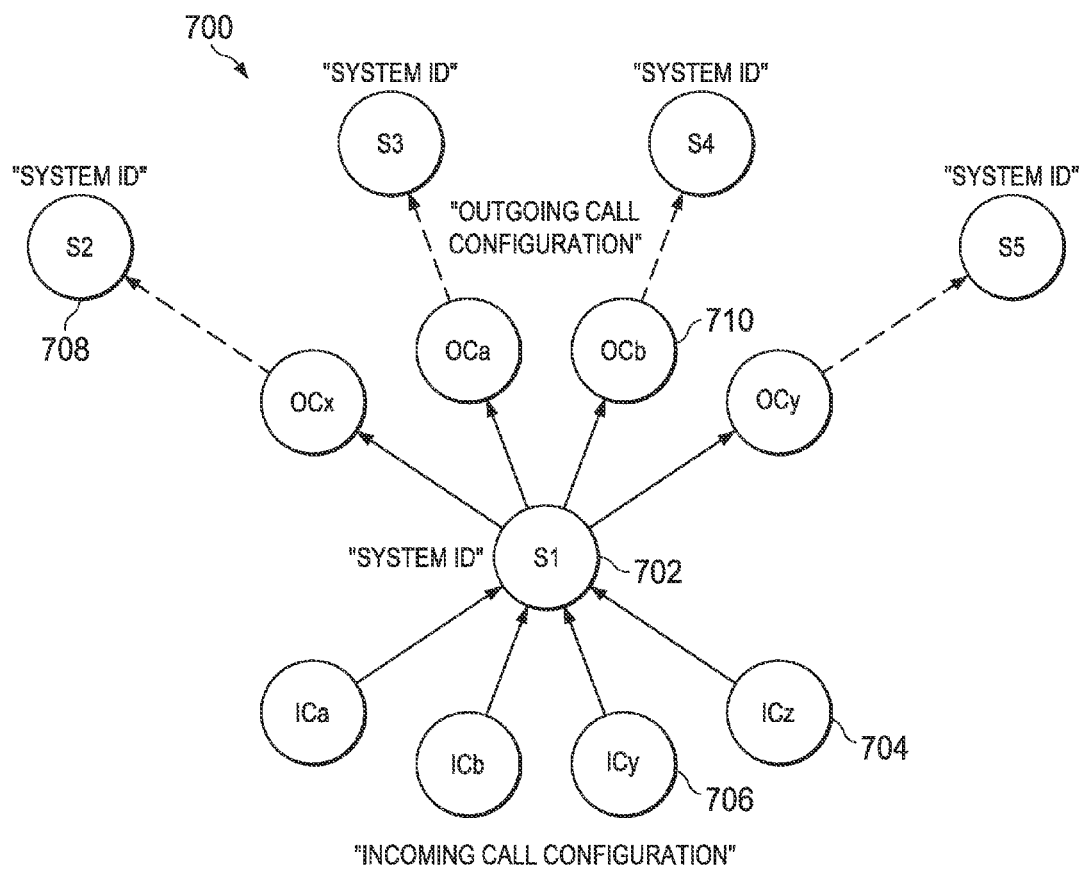
FIG. 7 is a schematic representation of an extended call graph for a system.

The next step is the determination of message flows from a system based on outgoing calls 506. As outgoing calls are directed towards a specific system, the corresponding call configuration often contains the identifier of the system that receives the call. In this case, the identifiers will be matched against the identifiers of the systems discovered in the first step. This step will result in an extended call graph for a system with a specific identifier, as shown in FIG. 7. This happens by adding the systems to which an outgoing call configuration exists. FIG. 7 is a schematic representation of an example extended call graph for a system 700. The uniquely identified system $S_1$ 702 has different incoming call configurations (e.g., ICz 704 and ICy 706), which are connected to outgoing call configurations (e.g., OCb 710) for other unique systems (e.g., $S_2$ 708) via message flows.

Figure 8:
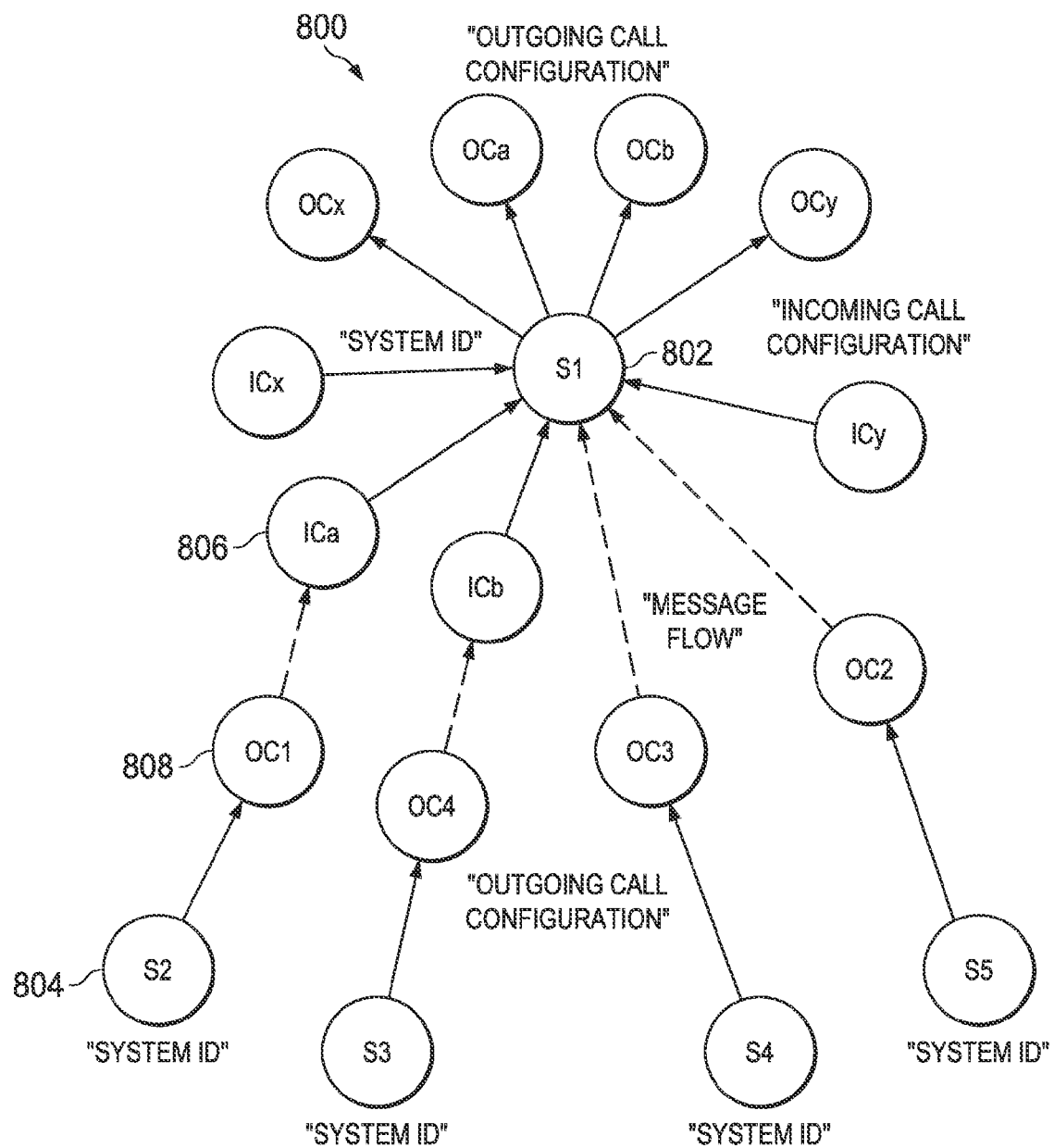
FIG. 8 is a schematic representation of an extension of the call graph by adding systems.

Then, the message flows to a system based on incoming calls are determined 508. For each incoming call configuration of a particular system, the identifier of the calling system is matched against the systems found in step 502. This is similar to step 506, but in this case the algorithm searches for systems sending to the system being inspected, while in step 506, it was looking for systems that received calls from the examined system. However, even though it is common to find a receiver in an outgoing call configuration, it is not very common to find a sender in an incoming call configuration. The reason for this is very simple. For example, person A can send a post card to another person B. In order for the post card to reach B, A needs to write the address of B on it, otherwise the post office would not know where B lives. However, for the post office, it is not relevant to know where A lives. Therefore, in order to bring the post card to B, it is not mandatory for A to write his or her address on the post card. The same is true for systems and call configurations. For that reason, a lot more outgoing/receiver pairs will be discovered than incoming/sender pairs. All in all, this step will further extend the graph formed by step 506 as it will add the systems from which incoming calls are received. An example for the resulting graph is shown in FIG. 8. FIG. 8 is a schematic 800 of an example extension of the call graph by adding systems. The system $S_1$ 802 communicates with the other systems (e.g., $S_2$ 804) directly or indirectly via its incoming call configurations (e.g., ICa 806) and the outgoing call configurations of the other system (e.g., OC1 808). The addition of the systems that the communication comes from further extends the call graph.

Figure 9:
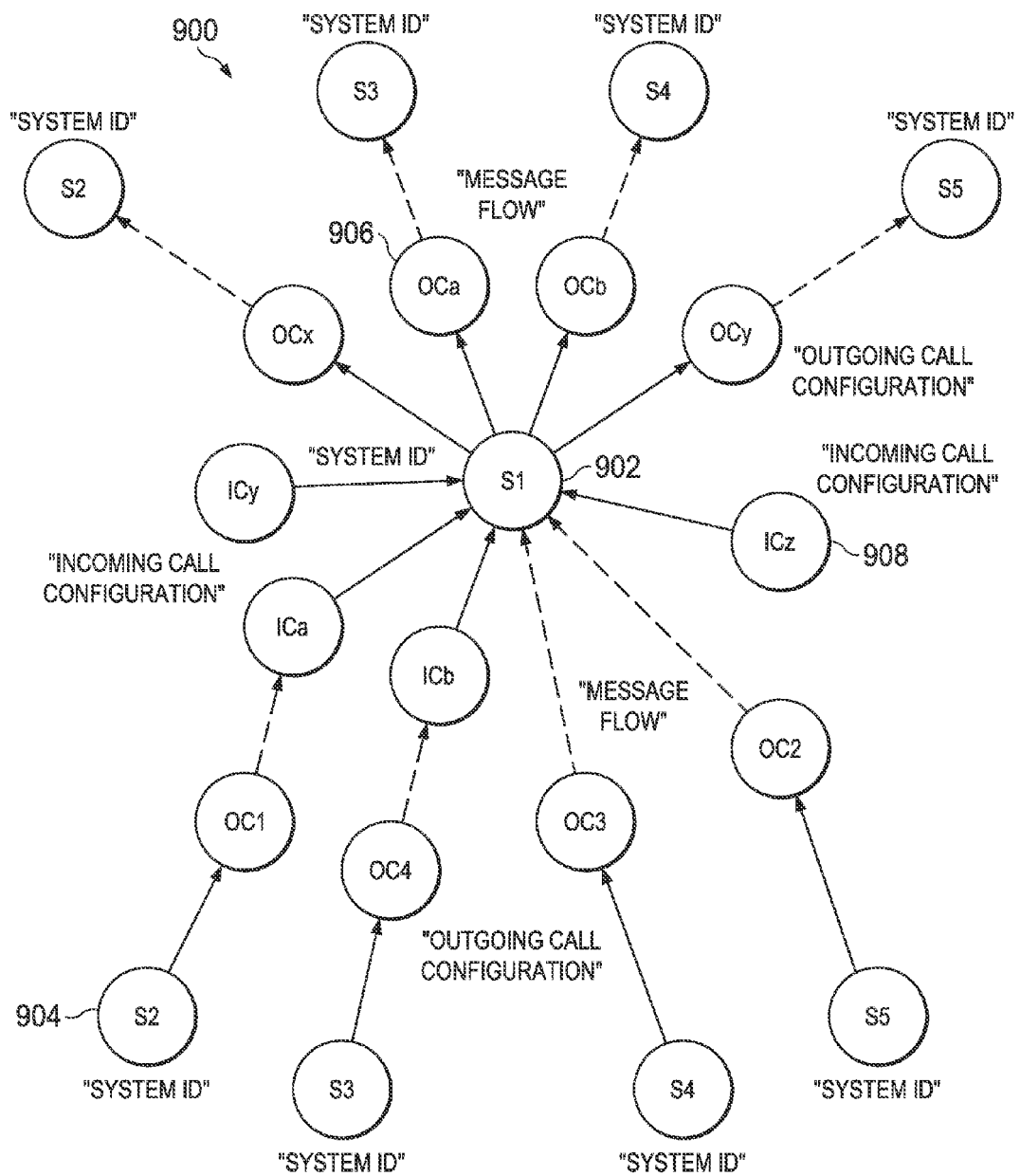
FIG. 9 is a schematic representation of a merged graph for the system $S_1$ as a result of Steps 2, 3 and 4 of FIG. 5.

In the next step, the call graphs for the systems are merged and the Network is formed 510. In this step, the algorithm will try to determine more message flows by matching already discovered incoming and outgoing call configurations from different identified systems. This is done by matching compatible message types or protocols. It is possible that some incoming call configurations do not match the already identified outgoing call configurations or the other way around. Nevertheless, these configurations are still kept in the Consolidated Model. After this step is successfully done, there will be some additional links between the already created graphs. FIG. 9 is a schematic of a merged graph 900 for the system $S_1$ as a result of Steps 504, 506 and 508 (of FIG. 5). This graph 900 shows all systems (e.g., $S_2$ 904) and configurations (e.g., OCa 906 and ICz 908) that are directly or indirectly communicating with system $S_1$ 902 via message flows.

The next step links the message flows with the application and integration content 512. The reason for this step is that the result of the previous steps is a view on the network, but the discovered message flows only represent the communication between hosts and systems. However, outgoing call configurations may also have a link to application and integration content which is deployed and running on the systems. For an application host or system and a specific outgoing or incoming call configuration, the link to a particular application proxy or to the system itself is determined. This is important because there might be a lot of applications running on one host at the same time. For an integration bus, enterprise service bus or B2B gateway and a particular incoming call configuration, this step determines one or a set of outgoing call configurations. This is referred to as an integration process later.

The final step is the incorporation of user enrichment 514. The quality of the Consolidated Model will improve over time as the algorithm gathers information from different data sources. Furthermore, it can learn from direct user input, also called "user enrichment." These facts are marked by the postfix user to highlight the different origin compared to the discovered facts, which are indicated by the postfix_discx.

Even though they are not mentioned in the steps of the Consolidation Algorithm, there is more information that the Consolidated Model administrates, for example about interfaces of system or applications that run on systems. These types of information are not (yet) processed during the consolidation. Nevertheless, they should be displayed on the Linked Business Graph.

In order to ensure the Consolidated Model to be consistent, the facts have to be validated. In the context of the Business Trading Web (see FIG. 4), knowledge validation is a process which ensures that all facts in a fact set are consistent. This implicates that each fact belongs to the model of the Business Trading Web, i.e., its structure is as expected and it contains the essential information needed to create the business graph. Therefore, validity includes
1. the existence of all required arguments;
2. the compliance with any restrictions that may have been defined for an argument (e.g., the length or pattern of the name of a system); and
3. the feasibility to resolve all dependencies between the facts (for example, a valid system and host fact for each runsOn fact).

When resolving the dependencies between the facts, there has to be one key argument that uniquely identifies a fact. This argument is the URI of the fact. In general, a "Uniform Resource Identifier (URI) is a compact sequence of characters that identifies an abstract or physical resource." As a URI identifies resources, it ensures that the corresponding facts that a fact depends on are found. As a result, most of the facts have one argument that contains their URI as a primary key, which is used to uniquely identify them. Other facts also contain the URI of other facts, but these URIs are used as references to facts that they depend on. For example, the validation of a system fact involves the following investigations:

1. Does the system have a name and a URI? The name will be displayed on the graphical user interface and the URI is needed to identify the fact and resolve the dependencies.
2. Is the name of the argument at least one, but no more than 255 characters long?
3. Is there a valid data fact that has the same URI than the system fact?

As a result, the system fact is valid, if and only if all three requirements are fulfilled.

The incentive for knowledge validation is to prevent the knowledge base from becoming inconsistent due to different causes. There may be implementation errors in the data discovery and extraction from the source systems. For example, when there is a change in the source code of these components, the discovery may not work correctly anymore and thus distort the rather correct facts. In order to notice these implementation errors, the knowledge validation may be useful. Furthermore, users are allowed to inject facts as well. This is also a potential source of incorrect and inconsistent facts. Finally, customers or partners may build their own "fact providers", which extract facts from source systems and thus are possible causes of incorrect facts. Irrespective of the source of the facts stored in the knowledge base, they ought not cause the whole knowledge base to become inconsistent. For these reasons, the validation is crucial.

As mentioned before, the knowledge base is supposed to be consistent. Therefore, a validation before the persisting of the facts seems to be reasonable. The best point of time is during or after the inbound processing of the facts because if the validation is done right before the persisting process, the whole consolidation process has been finished. If there is one invalid fact, it is reasonable to detect it before the consolidation process starts. On the other hand, as the Datalog facts may also be exported into the standard "fact providers" or the ones compiled by the partners or customers, another reasonable point of time is before the export of the facts. This ensures that only valid facts are exported.

Deterministic Finite Automata may be used for fact validation. Technical systems may behave based on events. That is, they stay in a state until a specific event happens. Depending on their state and the event, they react with a specified action. Thus, the state is the "memory" of the system. Consequently, an event has two effects. On one hand, it causes the machine to noticeably react and on the other hand, it may lead to a change of the machine's internal state.

This concept can be applied for the issue of fact validation. The input of a fact causes the set of facts to be either consistent or not. Furthermore, looking at the issue more granular, the validation of an argument may cause the fact to be valid or not. Therefore, this issue can be solved using the concept of Finite Automata, which are automata with a finite set of states. There are two kinds of finite automata: acceptors, which accept or decline an input, or transducers, which read an input and use it to generate an output.

The matter of fact validation has to be done by an acceptor automaton as it either accepts a valid fact or declines an invalid fact. However, before the finite automata can be further introduced, some main concepts of automata theory have to be brought up. There is the alphabet $\Sigma$, which is a finite, nonempty set of symbols. For example, the alphabet $$\Sigma=\{a, b, c, \ldots, z\}$$

represents all lower-case letters. Furthermore, a string is a finite sequence of some alphabet's symbols. If a string consists of zero symbols, it is called the empty string ($\epsilon$). The amount of symbols that form a string w is called the length of the string, which is |w|. For example, the length of the empty string |ε|=0. For any alphabet Σ, the set of all strings of a certain length k are expressed as $Σ^k$. For any alphabet Σ, the set of all strings with the length 0 is $Σ^0=\{ε\}$. This means that the only string whose length is 0, is the empty string ε. Taking the example alphabet with the lower-case characters, the set of strings with the length 2, $Σ^2=\{aa, ab, ac, \ldots, zz\}$. The set of all strings over an alphabet Σ is denoted Σ*, which is defined as $$Σ^* = Σ_0 \vee Σ_1 \vee$$

The set of all strings chosen from some Σ* for a particular alphabet Σ is also called language. For so me alphabet Σ, L is the language over Σ, if $$L \subseteq Σ^*$$

The only constraint of a language is that all alphabets are finite. Even though they may have an infinite number of strings, languages are restricted to only contain strings that are in one fixed, finite alphabet. The decision of whether a given string is a member of a given language is called a problem. For fact validation, the problem is to decide whether a fact is valid, i.e., whether it is a member of the language which only consists of valid facts.

As already mentioned above, there are different types of automata. There are finite and non-finite automata. One type of a finite automaton is the Deterministic Finite Automaton (DFA), which is a finite automaton that can only be in one state at the same time. In response to some input, there is a transition to one state out of the set of states of the DFA. In contrast to Nondeterministic Finite Automata (NFA), which can be in more than one state at the same time, DFA can directly be executed on a computer. The NFA first has to be compiled into a DFA in order to execute it, but in return, it allows use of a "higher-level language".

Formally defined, a DFA has the following characteristics:
a finite set of states (Q);
a finite set of input symbols (Σ);
a transition function (δ), which has a state q and an input symbol a as arguments and returns a state p. Therefore, δ(q, a) =p describes the arch labeled a from q to p;
a start state ($q_0$), so that $q_0 \in Q$; and
a set of final or accepting states (F), so that $F \subseteq Q$.
One way of describing a DFA is using the five-tuple notation:

$$DFA=(Q, Σ, δ, q_0, F).$$

Figure 10:
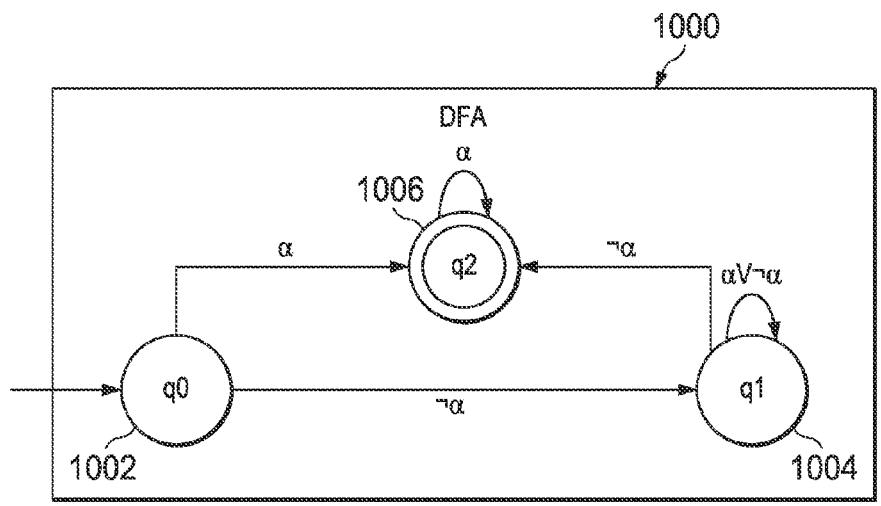
FIG. 10 is a schematic representation of a transition diagram of a Deterministic Finite Automaton.

There are other ways to represent an automaton. One notation is the transition diagram, which is a graph that contains one node for each state in Q. Furthermore, there is an arch from node q to node p labeled a for each state q in Q and each input symbol a in Σ. Furthermore, there is one arrow, having no origin from any state, into the start state $q_0$ of the automaton. Nodes that represent accepting states are marked by a double circle while all states that are not in F (and therefore are non-accepting states) are marked by a single circle. An example of a transition diagram is shown in FIG. 10. FIG. 10 is a schematic representation of a transition diagram 1000 of a Deterministic Finite Automaton (DFA). The DFA has three states. Depending on the input, it uses the available transitions to either go to its accepting state or to the non-accepting state.

For each of the three states $q_0$ 1002, $q_1$ 1004, and $q_2$ 1006, there is one node in the graph. The start state is $q_0$ as there is an arrow with no origin going into it. The state $g_2$ is the only node marked by a double circle, therefore it is the only final state of the DFA. Moreover, there are arches between the states. For example, there is an arch labeled a from $q_0$ to $q_2$, which represents the transition function $δ(q_0, a)=q_2$. The automaton in FIG. 10 is also represented by the following five-tuple notation:

$$DFA=(\{q_0,q_1,q_2\},Σ,δ,q_0,\{q_2\}).$$

The alphabet of the DFA is Σ={a, a}, which means for this example, the input is differentiated in being either a or not a (¬ a). Note that in the transition diagrams for DFA, there is one arch for each input symbol out of the alphabet Σ, which goes out of this state.

As mentioned above, an automaton can either be an acceptor or a transducer. Talking only about acceptors, the action of accepting is not determined by the state the acceptor automaton is in for a single input symbol, but rather for a list of input symbols, which is called a string. The issue is the determination of the state the automaton is in after processing the whole input string w. In order to determine the last state of an automaton, the extended transition function has to be defined. Unlike the transition, which determines the next state for a given state and a given input symbol, the extended transition function determines the last state for an input string. The extended transition function δ̂ of DFA can be defined by induction on the length of the input string.

When there is no input symbol, the automaton stays in state q, which is its present state:

$$δ̂(q,ε)=q.$$

If there is a string w that is composed of a substring x and its last symbol a, then:

$$δ̂(q,w)=δ(δ̂(q,x),a).$$

This means, in order to determine δ̂ (q, w), the state the automaton is in after processing the substring x (which is δ̂ (q, x)) is determined first. Assuming this state is called p, then δ̂ (q, x)=p. Therefore, δ̂ (q, w) describes the state that the automaton is in after the transition from p with the input symbol a. This results in δ̂ (q, w)=δ (p, a). Using the information about the DFA, its states and transitions, the concept of an acceptor can now be applied for knowledge validation.

Figure 11:
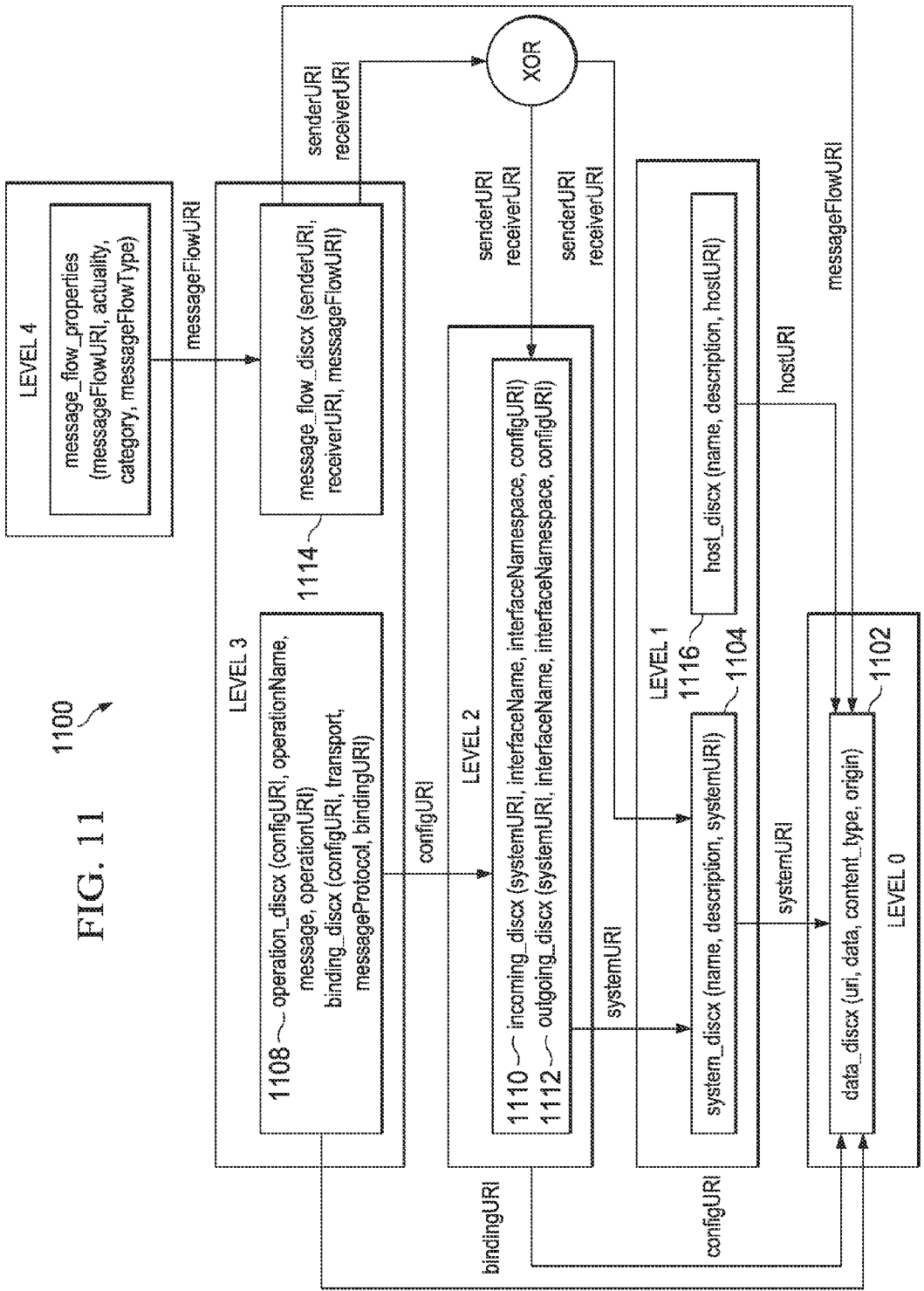
FIG. 11 is a graph showing an excerpt of the dependencies of the facts.

The knowledge to be validated may be described using Datalog facts or other fact model. Facts may depend on other facts in accordance to the Consolidated Model. Some of the facts of the business trading web and their dependencies are shown in FIG. 11. FIG. 11 is a graph showing an excerpt 1100 of the dependencies of the facts. This graph shows an excerpt of the facts that depend on other facts. For example, for a system_discx fact 1104 to be valid there has to be a data_discx fact 1102 with the same key (e.g., URI). Another example is an operation_discx 1108, which depends on an incoming_discx 1110 and/or outgoing_discx 1112 with its configURI and on a valid data discx with its operationURI. Furthermore, it is possible that one fact depends on one of two facts, e.g., a message_flow_discx, whose senderURI and receiverURI depend on either a valid incoming_discx 1110/outgoing_discx 1112 or a valid system_discx 1104.

As FIG. 11 shows, there are some "clusters" of facts that may be validated independently from others. For example, when validating a message_flow_discx 1114, the host_discx 1116 facts are not relevant. However, the system_discx 1104 facts are all relevant as the senderURI and receiverURI depend on either an incoming_discx 1110/outgoing_discx or a system_discx 1104. If it depends on two configuration facts, these facts also depend on system_discx 1104 facts and so on. This issue is shown in FIG. 12.

Figure 12:
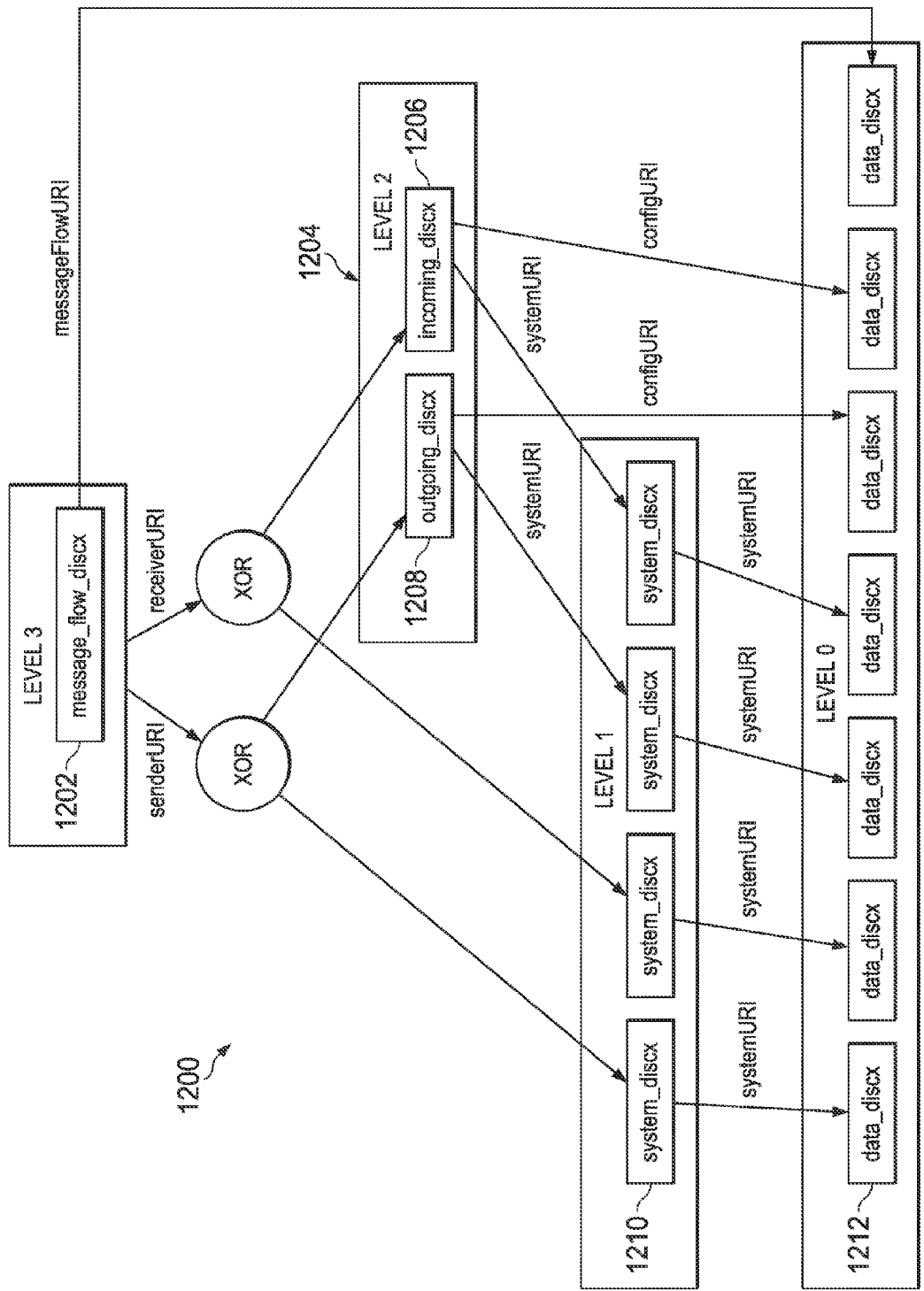
FIG. 12 is an excerpt of example resolved dependencies of a message_flow fact.

FIG. 12 is an excerpt 1200 of example resolved dependencies of a message_flow_discx fact 1202. FIG. 12 shows facts that may be relevant for the validation of a message_flow- _discx fact 1202 (where the arrow means "depends on"). It is possible that a fact depends on either one fact or another.

For example, a fact of level 2 1204 or higher does not necessarily depend on all lower-level facts. As a result, it is possible to split a set of facts to be validated into subsets if and only if the shared facts are duplicated. For example, a set that is composed of operation_discx, binding_discx (as shown in FIG. 11), and message$_{\_flow\_}$discx 1202, incoming_discx 1206, outgoing_discx 1208, system_discx (e.g., 1210), host_discx (e.g., as shown in FIG. 11) and data_discx (e.g., 1212) facts, one possibility to distribute the facts is using the following subsets $S_i$ (the_discx of the fact predicates is omitted due for readability):

$S_1 = S_{operation} \vee S_{binding} \vee S_{incoming} \vee S_{outgoing} \vee S_{system} \vee S_{data}$ $S_2 = S_{messaged\_flow} \vee S_{incoming} \vee S_{outgoing} \vee S_{system} \vee S_{data}$ $S_3 = S_{host} \vee S_{data}$ As a result, $S_1$, $S_2$ and $S_3$ can be validated independently from each other as long as all fact sets including only facts with the same predicate are duplicated before.

In order to be able to validate a fact, its dependencies are resolved. This resolution is facilitated by the Deterministic Finite Validation Automaton (DFVA). The automaton used for fact validation (FVA) can be described just like the finite automaton described above. It also has a set of states (Q'), a set of input symbols ($\Sigma'$), a transition function ($\delta'$), a start state ($q_0'$), and a set of accepting states (F'). The five-tuple description of this automaton is shown below:

$$FVA = (Q'; \Sigma'; \delta'; q_0'; F').$$

Some parts of this definition, however, can be interpreted in a different way than for the standard deterministic finite automaton that accepts regular languages:

Q': The set of states. The automaton is in one of those states before the validation of an argument. Afterwards is can be in the same as before or in another state out of Q'.

$\Sigma'$: The set of input symbols is the set of arguments of a fact, which can be either valid or invalid. Therefore, $\Sigma'$ can be interpreted as one fact with the restriction that its arguments are in an ordered set or, more precisely, a list.

$\delta'$: The transition function represents the validation of one argument, i.e., it determines whether the input argument is valid or not.

$q_0'$: For the fact validation automaton, the start state is the state that the automaton is in before it starts to validate the first argument.

F': The set of accepting states includes only one state, which is the state the automaton goes to after successfully validating all arguments. Therefore, the success of the validation can be determined by investigating whether the automaton is in its accepting state after validating the fact. Let $q_n$ be the state that the automaton is in after the fact validation, then $q_n \in F' \rightarrow$ fact is valid and $q_n \notin F' \rightarrow$ fact is not valid.

The construction of the automaton is done using inductive proof of the conversion of regular expressions (and thus regular languages) to automata. The knowledge to be validated is not necessarily a text string. Rather, it may be represented by complex facts (e.g., encoded in Datalog), the validity of which is defined by a model that may be specified by a human. Therefore, this approach possibly has to be extended to more powerful languages.

The generative power of languages can be classified into formal grammars and the languages that they describe into four categories. A grammar G is defined as a four-tuple (V, $\Sigma$, P; S):

V is the set of nonterminal symbols (i.e., variables that can be replaced by terminal symbols using some kind of rules).

$\Sigma$ is the alphabet of terminals or terminal symbols which cannot be replaced any more. They are the basis of the language.

P is the finite set of production rules which consist of a left-hand side and a right-hand side. The left-hand side consists of a nonterminal symbol while the right-hand side can consist of terminal or nonterminal symbols or a combination of both. A production rule is similar to a mathematical equation, where the right-hand side is assigned to the left-hand side of the equation. In general, it is denoted as $l \rightarrow r$.

S is the start symbol of the grammar. The definition of a grammar starts with this symbol. All other symbols are reached by traversal as more and more nonterminal symbols can be replaced by terminal symbols using the production rules.

As mentioned above, there are four types of grammars:

Type-0: Unrestricted Grammars: This type of grammar includes all grammars that are covered by the definition above.

Type-1: Context-sensitive Grammars: Grammars of this type are also Type-0 grammars. However, each production rule $l \rightarrow r$ has to fulfill the following condition: $|l| \leq |r|$. As a result, after the application of a production rule, the derived string cannot be shorter than before.

Type-2: Context-free Grammars: A grammar of Type 2 is context—sensitive, but the left-hand side of any production rule must consist of only one nonterminal symbol. Therefore, for all productions $l \rightarrow r$, it applies: $l \in V$. Grammars of Types 1 and 2 are used for compiler design and construction. Moreover, the syntax of most programming languages can be described by context-free grammars.

Type-3: Regular Grammars: Every regular grammar is context-free. Furthermore, the left side of each production rule consists of a nonterminal symbol. However, the right side of any production rule must consist of an empty string $\epsilon$ or a terminal symbol out of $\Sigma$, which may or may not be followed by a nonterminal symbol out of V. Therefore, the form of each production rule $l \rightarrow r$ of a right-linear regular grammar is formally characterized with:

$l \in V$ and $r \in \{\epsilon\} \cup \Sigma \cup \Sigma V$

In general, the lexical structure of programming languages may be defined using Type-3 grammars. As a result, when Ln describes the language that is constructed by a grammar of Type n, the relationship of the four types of grammars can be described as $$L0 \supset L1 \supset L2 \supset L3.$$

The power of the language decreases from type 0 to type 3. Therefore, a Type-2 language (with a context-free grammar) is an extension of a regular language which has a Type-3 grammar. However, for the construction of the automaton, it is assumed that it only accepts regular languages because the content of the arguments are simple strings. Nevertheless, the constructed automaton may have some advanced features in order to resolve the dependencies of the facts.

A Nondeterministic Finite Automaton (NFA) is a finite automaton that can be in more than one state at once. This enables it to "guess" something about its input. For example, it can "guess" that the fact has more arguments or that it does not. The interesting thing about NFAs it that they can accept the same language as DFA even though they might be designed easier than the corresponding DFA. The definition of an NFA is similar to the definition of a DFA:

$$NFA=(Q;\Sigma;\delta;q_0;F).$$

Furthermore, the language of a NFA that processes regular expressions is defined as $$L(NFA)=\{w|\hat{\delta}(q_0;w)\cap F\neq\emptyset\}$$

That means, that L(NFA) is the set of strings w in $\Sigma^*$ such that the extended transition function $\hat{\delta}$ ($q_0$;w) contains at least one final state while the set of final states is not empty. The main difference between NFAs and DFAs is the type of value that the transition function $\delta$ returns. While a DFA returns one state, a NFA returns a set of states. Furthermore, there does not have to be a transition out of each state, which means, the sequence of states may "die." However, the extended transition function is similar to a DFA's except that the next states of one state are determined by following all arcs out of this state labeled with the last input symbol.

Considering the differences of NFAs and DFAs, the question now is how they can both accept the same language. As mentioned above, every language described by a NFA can also be described by some DFA, even though in the worst case, the DFA will have more states than the corresponding NFA. Usually, the DFA has about as many states as the NFA, although it may have a lot more transitions. In order to find the corresponding DFA for a given NFA, a procedure called subset construction has to be used. The basis of the subset construction is an NFA N=($Q_N$; $\Sigma$; $\delta_N$; $q_0$; $F_N$). The aim is to construct a DFA D=($Q_D$; $\Sigma$; $\delta_D$; {$q_0$}; $F_D$) such that L(D)=L(N) while the alphabets ($\Sigma$) of both automata are the same. The main idea of subset construction is that the constructed states of the DFA are sets of states of the NFA. For example, the start state of D is the only state included in the set that represents the start state of N. The construction of the other components of D is done as follows:

The set of states $Q_D$ of the DFA is the set of subsets of $Q_N$. If $Q_N$ has n states, $Q_D$ will have $2^n$ states. However, there are states in $Q_D$ that cannot be reached from its start state, as inaccessible states may be "trashed." This means they are not shown in the transition diagram. As a result, the amount of states in $Q_D$ may be much smaller than $2^n$.

The set of accepting states $F_D$ is the set of subsets of the NFA that include one or more final states of the DFA, but not less. Therefore, FD is the set of subsets S of $Q_N$ such that S $\cap$ $F_N \neq \emptyset$.

To compute $\delta_D$ from a subset of $Q_N$ and a given argument a, the union of all states, that one state out of the subset goes to on an arc labeled a, is taken. More formally, for each subset S_QN and for each input symbol a in $\Sigma$, $$\delta_D(S, a) = \bigcup_{p\ in\ S} \delta_N(p, a),$$

is determined.
Subset construction is usually done using transition tables. However, as this seems to be very time-consuming, there is an approach, call "lazy evaluation," which can be performed on the subsets:

1. There is the singleton set that consists of only the start state of the NFA and is accessible at the beginning.
2. After determining the set S of accessible states, for each input symbol a, the set of states $\delta_D$(S; a) is computed. All of these states are accessible as well.

Epsilon Nondeterministic Finite Automaton ($\epsilon$-NFA) is defined similarly to the NFA described above:

$$\epsilon\text{-}NFA=(Q;\Sigma;\delta;q_0;F).$$

All the components of the definition can be interpreted the same as for an NFA, except $\delta$, which is now a function that takes two arguments. First, it takes one state out of Q, which is the state the automaton "comes from." Second, it takes a member of S U {$\epsilon$}, which is either an input symbol out of the alphabet, or the symbol $\epsilon$. Note that in this definition, $\epsilon$, the empty string, is not a member of the alphabet $\Sigma$.

The so-called $\epsilon$-transition enables the $\epsilon$-NFA to go to the next state spontaneously, i.e., without any input. This possibility does not change the language accepted by the automaton, but it provides some "convenience" on the automata construction. For example, an optional input symbol can be modeled this way.

However, with new input symbols, there are also new procedures to handle them. Therefore, the $\epsilon$-closure needs to be introduced in order to define the extended transition function. Formally, the $\epsilon$-closure is defined by recursion:

Basis: State q is in ENCLOSE(q).
Induction: If state p is in ENCLOSE(q) and there is an arc from p to another state r labeled $\epsilon$, then r is ENCLOSE(q). Therefore, ENCLOSE(q) also contains all states in $\delta$(p, $\epsilon$).

This means that the epsilon closure of a state contains all states that can be reached from this state with arcs exclusively labeled $\epsilon$. Similar to standard NFAs, the extended transition function of the $\epsilon$-NFA reflects what the automaton does on the input of a string w consisting of symbols out of the alphabet $\Sigma$. Therefore, $\hat{\delta}$(q, w) is the set of states reached along the path whose labels form w where $\epsilon$'s do not contribute to w.

Construction of an $\epsilon$-NFA for Fact Validation may use the knowledge about DFAs, NFAs and $\epsilon$-NFAs, and it is possible to design an automaton that validates facts. The following inductive proof will construct an $\epsilon$-NFA, which is able to validate facts.

Theorem: There exists some $\epsilon$-NFA that validates facts.
Proof: This proof will show that there is some $\epsilon$-NFA that is able to validate facts. This $\epsilon$-NFA has the following characteristics:

1. Exactly one accepting state.
2. No arcs into the initial state.
3. No arcs out of the accepting state.

Assuming that each fact has at least one argument and there is at least one fact that has no arguments depending on other facts, the proof is done by structural induction on the input of the automaton.

Figure 13:
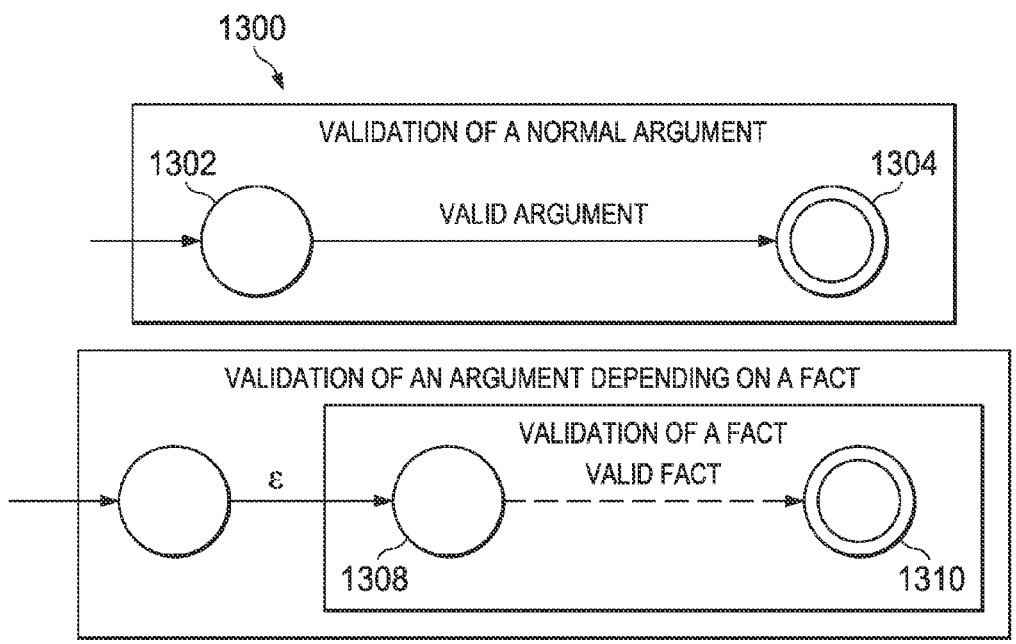
FIG. 13 is a graphical representation of two types of argument validations.

There are two types of arguments: a normal argument or an argument that depends on a fact whose level is lower than the level of the fact being validated. These two types of arguments are shown in FIG. 13. FIG. 13 is a graphical representation 1300 of two types of argument validations. There are two types of argument validations: the first type is a normal argument and the second type is an argument that depends on another fact. It is assumed that the basic input of the automaton is an argument to be validated.

If the input is a normal argument, the automaton goes from a first state 1302 to the next state 1304 if and only if the argument is valid. On the other hand, an argument depending on other facts is valid if and only if the lower-level fact is valid. If it is invalid, the argument is also invalid. Therefore, the lower-level fact has to be validated in the transition function. This fact validation is shown by the dotted edge in FIG. 13 transitioning from state 1308 to 1310 for a valid fact. The reason for the edge being dotted is that there may be more than one initial and one final state in this automaton.

Figure 14:
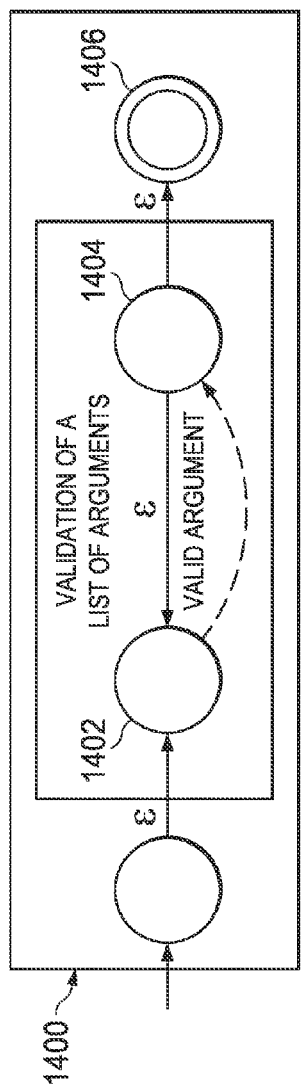
FIG. 14 is a graphical representation of a fact validation.

There are two different cases depending on the amount n of arguments of a fact. FIG. 14 is a graphical representation 1400 of a fact validation. There is one argument validation for each argument of the fact.

n=1: If the fact has only one argument, this argument is validated. The dotted edge in FIG. 14 represents the transition from state 1402 to 1404 on the input of a valid argument. As this is the only argument, the automaton spontaneously goes to its final state 1406 using the ε-transition. On the other hand, if the argument is invalid, the automaton stays in the first state 1402 of the argument validation box.

n>1: For the first argument, the automaton behaves as in the first case. However, after the first argument is validated, the automaton uses the ε-transition to go back to the first state 1402 in the argument validation box in order to validate the next argument.

In both cases, as soon as one argument is invalid, the automaton is stuck in any of the non-final states. It does not matter whether any following arguments are valid or not, the automaton cannot reach its final state any more. Therefore, the accepting state can be interpreted as the indicator of the success of the fact validation.

Figure 15:
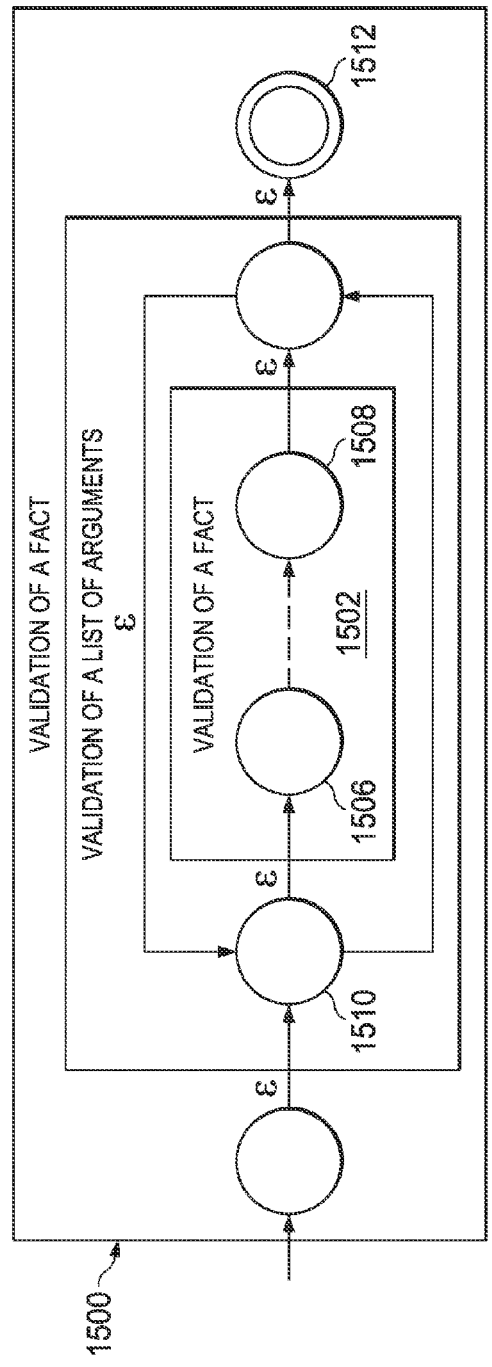
FIG. 15 is a graphical representation of a completely constructed Epsilon-NFA for validating facts.

As a fact consists of a list of arguments, the validation of a fact includes the validation of this list. An argument can be either required or optional. In the latter case, the validation is skipped by the &transition. However, if the argument is required, there is either the validation of a normal fact (the normal transition) or the validation of a fact that depends on another fact (the small "Validation of a Fact" box). As soon as one argument is not valid, the automaton is stuck in its state and will never reach the final state any more. The complete ε-NFA constructed in the induction above is shown in FIG. 15. FIG. 15 is a graphical representation 1500 of a completely constructed Epsilon-NFA for validating facts. This figure shows the embedding of the validation of a fact box 1502 into the validation of list of arguments box 1504. Validation of fact box 1502 includes two states 1506 and 1508. The dotted line is to signify the possibility of more than one initial and one final state. The automaton uses the &transition to go back to the state 1510 in order to validate the next argument.

Figure 16:
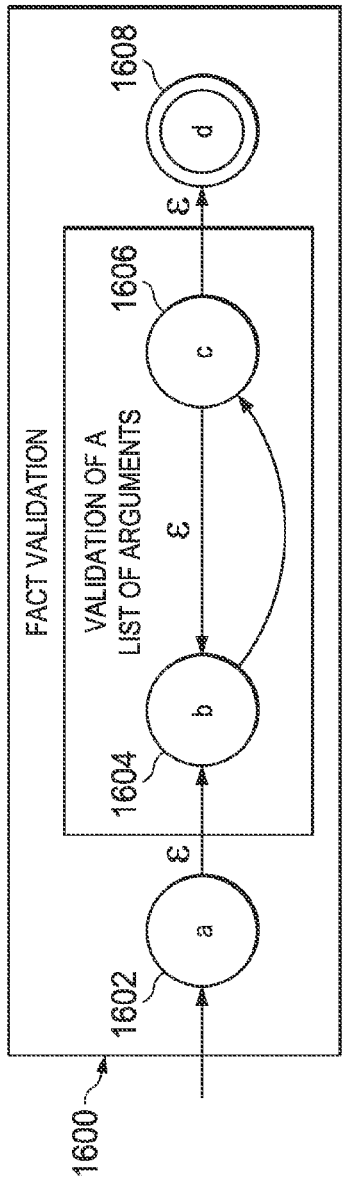
FIG. 16 is a graphical representation of fact validation ϵ-NFA used for subset construction.

In order to determine the final state 1512 of the automaton with a given fact as its input, the constructed &NFA has to be transformed to a corresponding DFA first. This is done by subset construction. The automaton which is assumed to be the basis of the subset construction is shown in FIG. 16. FIG. 16 is a graphical representation 1600 of fact validation ε-NFA used for subset construction. This is the same automaton as in FIG. 14, but its states are named alphabetically in order to uniquely identify them Applying subset construction, the first state of the corresponding DFA is the set of states that includes the start state of the ε-NFA and all states which can be reached by ε-transitions from this state on. Therefore, the set of start states of the DFA includes the states a 1602 and b 1604. If the input is a valid argument, the ε-NFA goes from state b 1604 to state c 1606. From c 1606, the states b 1604 and d 1608 can be reached by ε-transitions. Therefore, the next state of the DFA includes the states b 1604, c 1606, and d 1608. From this state, the automaton goes to the same state on the input of any other valid argument. If there have been only valid arguments, at the end of the validation, the ε-NFA goes to its accepting state using the last ε-transition. Therefore, the state {b, c, d} of the DFA is an accepting state.

Figure 17:
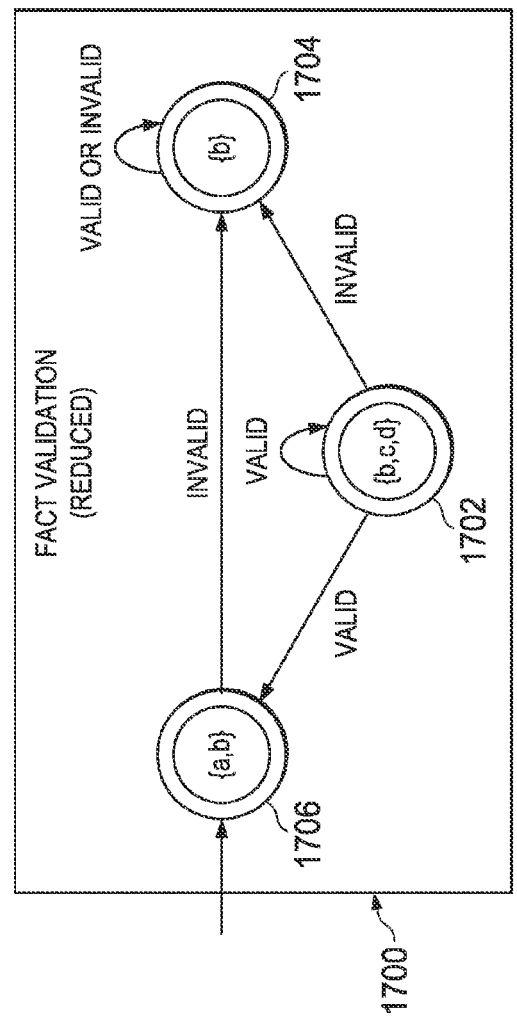
FIG. 17 is a graphical representation of a fact validation DFA created by subset construction.

If the first argument is invalid, the ε-NFA goes to state b using its ε-transition. Then, it stays in this state because it can only go to state c if the input is a valid argument. Therefore, the corresponding DFA goes to state {b}, which is a non-accepting state. It stays in this state, no matter whether the following argument is valid or not. If all previous arguments have been valid but the next argument is not, the ε-NFA stays in state b. Therefore, the DFA again goes from {a, b} 1706 to state {b} 1704. Thus, the fact becomes invalid on the input of an invalid argument, no matter whether it is the first argument or any other. The constructed DFA is shown in FIG. 17. FIG. 17 is a graphical representation 1700 of a fact validation DFA created by subset construction. The automaton finishes the fact validation either in {b, c, d} 1702, if the fact consists of only valid arguments, or in {b} 1704, if there is at least one argument invalid.

The Extended Transition Function After constructing a DFA out of an ε-NFA, the question is whether both automata are equivalent in terms of fact validation. The Validation DFA accepts facts with at least one argument, just as the ε-NFA. The success of the fact validation of both automata is represented by the state they finish their validation in. However, which state is this last state for a given argument? In order to determine the state the automaton finishes the validation in, the extended transition function has to be used. Unlike the usual DFA, which processes strings, the Validation DFA processes Datalog facts. Nevertheless, the extended transition function $\hat{\delta}$ is defined similarly by using a fact instead of a string and an argument instead of a symbol:

Basis: When the automaton has not started the validation, i.e., there is no fact to be validated, it stays in state q, which is the state it is in right now:

$\hat{\delta}(q,\epsilon)=q$.

Induction: If there is a fact $f(a_1, \ldots a_{n-1}, a_n)$, where $a_1, \ldots, a_{n-1}, a_n$ are the arguments of the fact with $n \geq 1$, then:

$\hat{\delta}(q,f(a_1, \ldots, a_{n-1},a_n))=\delta(\hat{\delta}(q,f(a_1, \ldots, a_{n-1},a_n)),a_n)$.

This means, in order to determine $\hat{\delta}(q,f(a_1, \ldots, a_{n-1}, a_n), a_n)$, the state the automaton is in after the processing all arguments until $a_{n-1}$, which is $\hat{\delta}(q,f(a_1, \ldots, a_{n-1}))$, is determined first. Assuming this state is called p, then:

$\hat{\delta}(q,f(a_1, \ldots, a_{n-1})=p$

Therefore, $\hat{\delta}(q,f(a_1, \ldots, a_{n-1}, a_n))$ describes the state that the automaton is in after the transition from p with the argument $a_n$. This results in $\hat{\delta}(q,f(a_1, \ldots, a_{n-1},a_n))=\delta(p,a_n)$ Thus, the extended transition function $\hat{\delta}$ can be defined as $\hat{\delta}(a,f)=d(\hat{\delta}(q,f(a_1, \ldots, a_{n-1}),a_n,$ which means that to determine the last state of the automaton validating a fact, the state that the automaton is in after the validation of the second-last argument of the fact has to be determined first.

Equivalence of the Validation DFA and the ε-NFA After the definition of the extended transition function, it is now possible to proof the equivalence of the DFA and the ε-NFA. Therefore, it has to be shown that both automata accept the same language.

Proof. Let $E =(Q_E; f, \delta_E; a; F_E)$ be the ε-NFA and $D=(Q_D; f, \delta_D; a; F_D)$ be the where $q_D$ is the start state of the DFA produced by subset construction. Assuming that L=L(D) for the DFA and L=L(E) for the ε-NFA, it may be shown that $$L(D)=L(E).$$

This is done by showing that the extended transition functions of both automata for the input of a fact $f(a1, a2, \ldots, a_n)$ are the same:

$$\hat{\delta}_D(q_D,f)=\hat{\delta}_E(a,f).$$

Note that the symbol a is representing the start state of the ε-NFA. Assuming that f consists of at least one argument $a_i$ and that this argument can be either valid (which is denoted as $a_{valid}$) or invalid ($a_{invalid}$), the equivalence of the automata is shown by induction on the amount of arguments.

Basis: First, the input of a fact with one single argument is assumed. Depending on the validity of the argument, the validation will be either successful or not:
1. If the argument is valid, the ε-NFA goes from b (which it went to from a using the ε-transition) to c. From there, it can also go to b and d, using its ε transitions. As it is assumed that there is only one input argument, the ε-NFA will finish the validation of a valid fact in d. The DFA goes to {b, c, d} on the input of a valid argument. The states, that both automata finish the validation in, are both accepting states, therefore the validation is successful.
2. However, if the input argument is invalid, the ε-NFA stays in its nonaccepting state b, which it went to from a using the ε-transition. The DFA goes to {b}. Both automata finish the validation in a non-accepting state, thus the validation was not successful and the fact is invalid.

In both cases, the validation result of both automata is the same. Therefore, for the input of a fact with a single argument, the automata are equivalent.

Induction: The input of a fact with more than one argument is assumed. Different constellations of valid and invalid arguments of a fact can occur:
1. The first argument is invalid, followed by a number of valid or invalid arguments: In this case, it does not matter whether the following argument is valid or not. The ε-NFA is stuck in and stops the validation of the fact while the DFA stays in {b}.
2. The first argument is valid, followed by one or more valid arguments: If all arguments of a fact are valid, the ε-NFA will always use the transition from b to c for the argument validation. As long as there are more arguments to be validated, it uses the ε-transition from c back to b. If there are no more arguments, it spontaneously goes to d, which is its accepting state. The DFA stays in {b, c, d}, its accepting state, on the input any number of valid arguments.
3. The first argument is valid, followed by an invalid argument: In this case, the ε-NFA stays in the non-accepting state b while the DFA stays in its non-accepting state {b}.
4. The first argument is valid, the second argument is invalid, the next arguments are either valid or invalid: If this happens, both automata behave as described in 3.

As both automata behave in the same way in all cases of facts containing more than one argument, they are equivalent. Consequently, the DFA can be used for fact validation.

Implementation choices are described below. Implementation of the automaton includes a structural and an object-oriented approach. In the structural approach, the states of an automaton are implemented as integer variables. A variable is used to save the actual state. When validating a fact, the actual state is looked up first and depending on it, the validation is done. For example, the following shows the class diagram of an automaton that validates data facts using the structure:

| DataAtomaton |
|---|
| +URI: int = 0 |
| +DATA: int = 1 |
| +CONTENTTYPE: int = 2 |
| +ORIGIN: int = 3 |
| −actualState: int |
| +goToNextState (argument:String) |

For each argument (i.e., state), there is an integer constant. The actual state is saved in the actualState variable. In the goToNextState method, the transition function is implemented.

For each argument of the data fact, there is one state which is represented by an integer constant. The state the automaton is in at the moment is saved in the actualState integer variable. The transition function is implemented in the goToNextState method which looks up the actual state and does the corresponding transition depending on the actual state (and argument respectively). If there are only facts with the same structure (i.e., predicate), this approach works fine. However, as the number of predicates increases, the amount of automata to be maintained increases as well. Furthermore, if the argument structure of a fact changes, the goToNextState method has to be adjusted as well in order to ensure the correct argument validation. For example, let the arguments data and origin of a data fact be validated differently. If these two arguments are switched in the model of dependencies, the whole class (including its integer constants and transition function) has to be changed as well. Furthermore, many arguments may be validated in the same way. For example, the data, content type and origin arguments of a data fact are all optional arguments with no special restriction. However, the transition function has to be implemented three times (once for each argument) as the transition function depends on the argument. As a result, the maintenance effort for this approach is very high.

The question now is whether there is any technique where the states can be reused in order to reduce maintenance effort and improve readability. One way of solving these problems is the encapsulation of the transitions into the states which is the main idea of the object-oriented approach. Furthermore, the states may have the same common interface as the automaton for the validation. Therefore, when an argument is supposed to be validated, the automaton delegates the validation to the actual state. Speaking in the terms of the design pattern, the Context is the FVA and the Concrete States are all states needed to model the validation. The transition function of each state returns the next state that the automaton should go to. However, the automaton has the control to go to the next state, which may or may not be state "suggested" by the actual state. The main advantages of the implementation of the design pattern are the improved maintainability and reusability. Especially for facts of the model of dependencies that have a plurality of arguments with similar characteristics (e.g., their optionality), one state implementation can be reused for all arguments with the same characteristics, no matter to which fact they belong. As the maintainability and reusability of the object-oriented approach outperform the structural approach, the object-oriented approach is takes as a basis from now on. As a result, the transition functions are attached to the specific state. Furthermore, the automaton is not only able to validate one fact type (i.e., facts with the same predicate), it is rather able to validate many facts with different predicates.

As mentioned above, each argument has a cardinality which tells whether the argument is optional or required. Therefore, the transition function of one state has to skip the validation of the argument. However, if the argument is required, it has to be validated.

If it is a simple argument, the transition function just has to check whether it is specified (i.e., a non-empty string) or not. However, if the argument is an URI which refers to a lower-level fact, this fact has to be validated as well. Therefore, the following states have been implemented:

Argument Validation: In the transition function of this state, an argument is validated in terms checking whether it is specified. If the argument contains an empty string, the transition function returns the state that the automaton is in at the moment. Otherwise it returns the next state.

Skip Argument Validation: This transition function simply realizes there is an argument but does not validate it. It does not matter whether the argument is an empty string or not. Therefore, this transition function always returns the next state.

Validation of a Specific Argument of a Particular Fact: In this transition function, there is a fact- and argument-specific validation implemented. For example, there is one transition function that only validates the name of system facts, which is defined to be a non-empty string that is less than 255 characters long.

Error State: This state represents any kind of unexpected input. For example, when the fact model for the given fact cannot be found, the start state of the automaton will be this state. If a fact has more arguments than the corresponding model, this state is the last state of the automaton. In any case, once the automaton is in this state, the fact cannot become valid any more. Consequently, the transition function of this state returns the same state on any input.

Fact Validation: This transition function is the most advanced one as it has to validate all facts that the actual fact depends on. This functionality will be explained in more detail below. However, when it comes to the transition function of the automaton, there are some differences to a standard DFA as the validation automaton has more powerful transition functions. This is the result of the extension of the language that the automaton accepts from a regular language to a type-2 language. As a result, the transition function of the Validation Automaton is a complex function which has to:
1. check whether an argument is a non-empty string;
2. skip the validation of an argument and do nothing;
3. do some fact- and argument-specific validation (e.g., check whether a system name is a non-empty string which consists of no more than 255 characters);
4. validate the URI of a fact, i.e., check whether a corresponding lower-level fact exists; and
5. in all cases, return the next state of the Validation Automaton (see Algorithm 4 below) if the validation was successful or return an error state if any of the validations mentioned above fail.

While the transitions 1 until 3 are simple tests on the length of the argument string, transition 4 is more complex as it includes the call of another FVA. In general, the transition function and its states are implemented in Java. Therefore, it is not only possible to use all kinds of Java constructs, such as variable declarations, conditions and loops, but also calls of other FVA, RFCs or access to SAP systems. This and the fact of Java being a context-free language results in the automaton having a context-free character. However, it is still a DFA accepting regular languages as the number of Java constructs to be used is limited to variable declarations, conditions and finite loops in order to ensure the termination of the validation. Other constructs should not be used as they may not terminate. For example, an RFC may freeze on the remote location. Thus, there will be no answer and the automaton stays in the transition function and therefore in its actual state. The fact might be rejected, even though it is possibly correct, just because the RFC failed. Therefore, there is no such "unsafe" construct in this implementation. This limitation ensures that the call of each automaton terminates. Consequently, the call of another automaton in a transition function is also not critical, as long as the fact model is correctly constructed, i.e., there are no circular references between different fact models.

Figure 18:
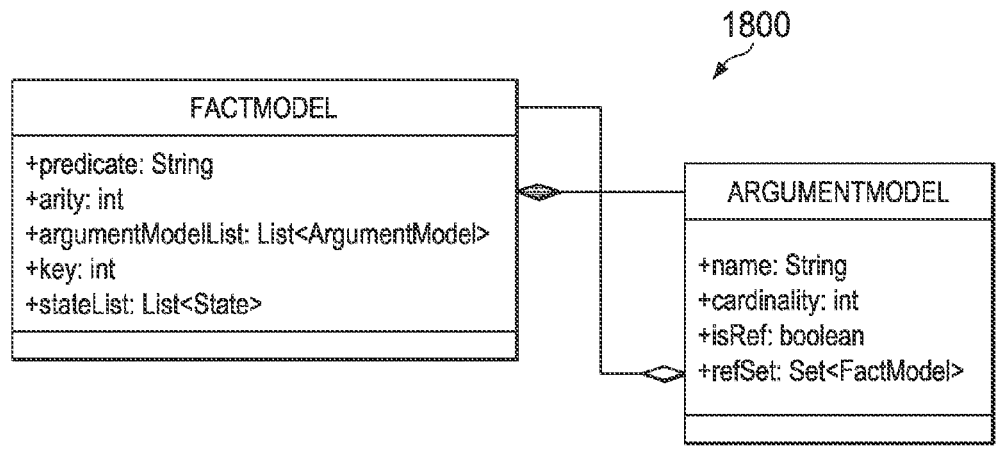
FIG. 18 is a graphical illustration of a semantic model.

All facts are modeled in a semantic model, which, once constructed, represents dependencies of the facts. The abstract fact and argument models are shown in FIG. 18. FIG. 18 is a graphical illustration of a semantic model 1800. This class diagram shows the semantic model 1800. A fact model consists of a number of argument models. In general, a semantic model is a subset of a domain model, which is the consolidated model described above. More precisely, the semantic model is an EDB (i.e., External Database) representation of the consolidated model.

The fact model contains information about the predicate and the arity of the fact. The list of argument models is composed of argument models, which are identified by a name. The cardinality tells whether the argument is optional (which is represented by the value 0) or required (1). The isRef variable tells whether the argument depends on other facts, which are included in the set of references (refSet). Furthermore, each fact model has a key value which specifies the argument that uniquely identifies the fact. Lastly, each fact has a list of states (stateList), which the FVA goes through.

The information is validation-specific, and, accordingly, the user who wants to validate the facts has to specify them. Therefore, an external domain-specific language (DSL) has been developed. In general, a DSL is a computer program language of limited expressiveness focused on a particular domain. Furthermore, an external DSL is separate from the language of the main program. External DSL can have a custom syntax or be any other language (often XML). In this case, a custom language was defined. A definition file has to be written in the DSL to describe the semantic model. The process of creating, modifying and using the definition file is described above.

In general, the validation automaton is not only able to validate one fact; it is also able to validate a set of facts. In fact, a normal user rather needs the validation of a set of facts than the validation of a single fact as the main reason for the need of the fact validation is the dependencies of the facts. The validation of a single fact is mostly used by the automaton itself. Therefore, the validation process is defined as the process in which the validation automaton validates a given set of facts.

Certain preparations are considered. For example the creation of the semantic model is needed by many components of the validation framework. Therefore, when the validation framework is started, the definition file is parsed and the semantic model is created. As mentioned above, the fact models do not only include information about the arguments, they also include the state list that the automaton will need in order to validate the particular fact. The creation of the state list is shown in Algorithm 1, which needs the corresponding fact model as an input in order to resolve the dependencies of the fact. Algorithm 1 is an example algorithm for determining the state list for a fact.

For all argument models, the first step is to check whether the argument is optional (see line 2). In this case, the validation of the argument needs to be skipped. If the argument is required, the next step is to check whether the argument refers to other fact models (see line 5). If there are no references to other facts, the algorithm searches for a fact- and argument-specific state, which has a specific naming. If there is such a state, the algorithm will take it (line 7). Otherwise, it will use the default state for argument validation (line 9). However, if there are dependencies to lower-level facts, a state for fact validation is added (line 12). At the end, the previously determined and the accepting state are added to the state list (lines 15 and 17) and the state list is returned (line 18).

Then, the automaton has to be prepared. This means, it needs some information before it is able to validate facts. It needs a context in which the facts will be validated. In general, a fact set includes a number of facts that may or may not have the same predicate. If the facts do not have the same predicate, they may depend on each other. The set of facts, that will be validated later on, is a subset of the context or the context itself:

$$\text{ValidationFactSet} \supseteq \text{Context}$$

For example, let the context C be a fact set that consists of a runs_on fact R with a system and a host fact (S and H) that each have a corresponding data fact ($D_S$ and $D_H$):

$$C = \{R, S, H, D_S, D_H\}$$

A fact set $S_1$, that is a subset of this context may be $$S_1 = \{S\}$$

If the arguments of all facts are valid, the fact set $S_1$ will be valid as well, as for the system fact, there is a corresponding data fact in the context. Now, let another subset $S_2$ be $$S_2 = \{R, I\}$$

where I is an incoming configuration fact. The fact set $S_2$ will not be valid even though the arguments of all facts will be valid because there is no data fact DI that matches the configURI of the incoming configuration. Let the last fact set $S_3$ be $$S_3 = \{R, S, H, D_S, D_H\} = C$$

The fact set $S_3$ will be valid as there are the corresponding lower-level facts in the fact set itself. Therefore, the automaton is not only able to validate a set of facts in the context, it is also able to validate the whole context.

In the validation fact set, there may be a large number of facts depending on other facts in the context. As a result, there are different strategies to validate facts. The first possible approach is the Random Approach, where the facts are validated as they are taken out of the set of facts to be validated. However, there are two other approaches that use the levels of the facts in the dependencies hierarchy to determine the validation order. The computation of the level is a recursive function applied on a fact model (see Algorithm 2). Algorithm 2 is an example algorithm for determining the level of a fact model.

The default level is 0 (line 1). In order to calculate the level of a fact model, to the level of each fact model, which the actual fact model depends on, 1 is added (line 9). Then, the sum is compared to the highest level found until now. If the sum is higher than the highest level found, it is taken as the new level (line 11). After iterating through all fact models, the calculated level is returned (line 18). The calculated level can be used for two different validation approaches. The higher-level facts can be validated first. This is called Top-down Approach.

When a higher-level fact is validated, the fact it depends on is validated during the validation of the dependent fact. For example, during the validation of a system fact, there has to be a check whether a corresponding data fact exists. During this test, an automaton which validates the data fact is called. It validates the corresponding data fact and, if it is valid, returns the next state to the parent (system) automaton. Therefore, most of the lower-level facts are validated during the validation of higher-level facts. In contrast to that, there is the Bottom-up Approach where the lower-level facts are validated first. Therefore, when the higher-level facts are validated, the facts that they depend on do not have to be validated again. They will be skipped.

Figure 19:
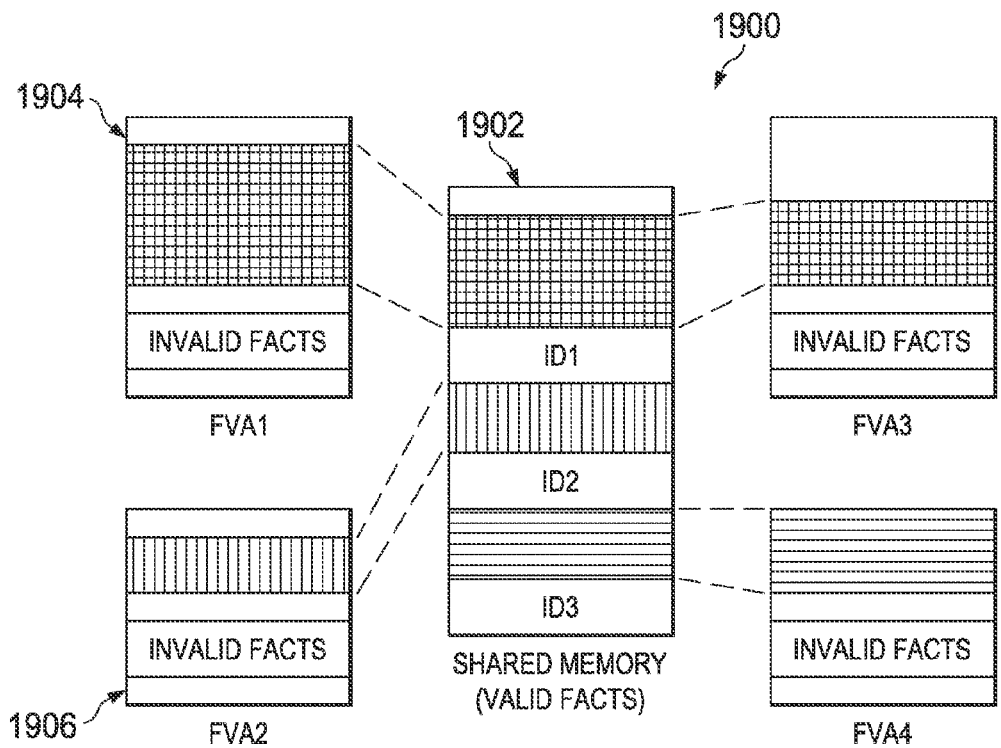
FIG. 19 is a schematic representation of an example implementation of a shared memory.

If the Top-Down and Bottom-Up approaches are supposed to be used effectively, a shared memory has to be used. FIG. 19 is a schematic representation of an example implementation 1900 a shared memory 1902. In addition to the local memory 1906, where it places invalid facts, each FVA (e.g., FVA1 1904) uses a part of the shared memory 1902 to put valid facts in. These spots can also be used by more than one automaton. The implemented shared memory facilitates the storage of all facts that have already been validated. Consequently, each FVA needs the ID of the part of the shared memory 1902 it is supposed to use. This enables it to put all valid facts into this part of the shared memory 1902. When any of the lower-level, already validated facts is supposed to be validated again, the automaton can skip this validation. Therefore, any time a sub-automaton is called, it gets the ID of a shared memory 1902 section as an input. As a result, it also puts all valid facts into the same part of the shared memory 1902 that the parent automaton uses. This facilitates a fact validation distributed between different automata. Furthermore, each automaton has a local memory 1906 where it puts all facts that have not been successfully validated. As a result, when it is supposed to validate the invalid fact again, the automaton can skip the validation because it already "knows" that this fact is invalid.

As soon as the automaton has got all the information it needs, it can start to validate a set of facts. As mentioned above, it does that using a given approach. The approach determines the order for the validation and the automaton will validate one fact after another in the order that the approach defines. However, before the actual validation can start, there has to be done some preprocessing (see Algorithm 3), which checks whether all conditions, needed to validate the fact, are fulfilled.

Algorithm 3 is an example algorithm for preprocessing for fact validation. At the beginning, the automaton checks whether the validation of the actual fact can be skipped because it is contained in the shared memory and thus has been validated before (line 2). If this is not the case, the automaton makes sure that:

The fact has not been marked as invalid before;
There is a fact model that has the same predicate as the fact;
The fact has at least one argument; and
The arity of the fact equals its number of arguments.

This error check is shown in line 5 of Algorithm 3. The last step is to determine (line 8) and set (line 9) the start state of the automaton. The determination of the start state is shown in Algorithm 4.

Algorithm 4 is an example algorithm for determining a next state for the automaton. In general, for each argument a, with the index i in the argument list, there is a state $S_j$ in the state list that includes the corresponding transition function so that i=j. This means that in order to get the state that includes the transition function that validates the next argument, the state $S_j$=I+1, whose index is one higher than the index of the actual argument, is returned (line 3). If there is no state $S_j$ for the argument $a_i$ such that i=j, this means that either the fact has more arguments than the corresponding fact model or the automaton is already in its final state and thus does not expect more arguments. Therefore, an error state is returned (line 5). For the determination of the start state for a particular fact, it is assumed that, as long as no argument is validated yet, the index of the actual argument is −1. In this case, the "next" state is the start state of the automaton.

After the determination of the start state, the actual fact validation can start. It is shown in Algorithm 5. Algorithm 5 is an example algorithm for validation of a fact. For each argument of the fact, the transition function of the actual state is called (line 3). It will return a state depending on the validation success. If this return state is the same state that the automaton is in at the moment, the validation of the argument was not successful. Then, the loop over the argument is stopped because if one argument is invalid, the fact cannot become valid any more (line 5). Otherwise, the actual state is set to the state returned by the actual state (line 7).

After the fact is validated (which means that either all arguments are valid or the validation was stopped as one argument was not valid), there is some post-processing. It mainly includes setting a variable which tracks the success of the validation of the fact set. The post-processing is shown in Algorithm 6.

Algorithm 6 is an example algorithm for fact validation post-processing. If the actual state of the automaton is its accepting state, the validation of the fact was successful. If so, and if the valid fact is the first fact that has been validated, the successful variable is set to be true (line 3). Note that this is only done for the first fact because the default value of the successful variable is false. The reason for this is that if no fact has been validated yet, the validation cannot be successful. Furthermore, the fact is added to the shared memory containing all valid facts if and only if the validation was successful (line 5). However, if the fact is invalid, the successful variable is set to be false (line 7) and the fact is added to the local set of invalid facts (line 8).

Hierarchical Call of FVA Until now, the transition function responsible for the validation of lower-level facts that the actual fact depends on was not further discussed. However, as mentioned above, this transition function is different from others as other automata are called. The fact validation transition function is shown in Algorithm 7.

Algorithm 7 is an example algorithm for a fact validation transition function. At first, the context for the local FVA is defined as the set union of the fact set that the parent FVA validates, the context of the parent FVA and the shared memory that contains all facts that have already been validated by the parent FVA (line 1). The parent FVA is the automaton whose transition function calls another automaton (in this case the local FVA). Then, all lower-level facts that the actual argument depends on are determined (line 2), which is shown in Algorithm 8.

Algorithm 8 is an example algorithm for determining dependency facts of an argument. After the determination of the actual argument model (line 1), for all fact models that the argument model depends on, all facts in the context with the same predicate are added to the set of prospect dependency facts (line 3). This means, that all facts that the actual fact may depend on are to be validated later on (Algorithm 7, line 3 ).

The procedure now is similar to the general fact validation (Algorithm 5) as the validation is skipped if the fact has already been validated. In this case, the next state of the parent automaton is added to a return state list (Algorithm 7, line 5), which collects the return states of all local FVAs in order to determine the final return state.

If the fact has not been validated yet, a local FVA is called to perform the validation (line 7). If the validation was successful, the fact is added to the shared memory and the next state is added to the return state set (lines 9 and 10). However, if the lower-level fact is not valid, it is added to the invalid fact set of the local FVA and the actual fact is added to the invalid fact set of the parent FVA (line 12). Furthermore, the actual state is added to the set of prospect return states (line 13). At the end, the return state out of the set of prospect return states is determined (line 17). This is shown in Algorithm 9.

Algorithm 9 is an example algorithm for determining a return state for a fact validation transition function. If the set of return states contains only one state, this state is returned (line 2). If there are more states in the set of prospect return states, an error state is returned if there is one in the set (line 4) because if this happens, an error has occurred during the validation of the local FVA. However, if the set contains the actual state, it is returned (line 6) as this means that the lower-level fact is not valid. If none of the cases mentioned occur, any state is returned (line 8). Then, the parent FVA can continue with its validation process.

Figure 20:
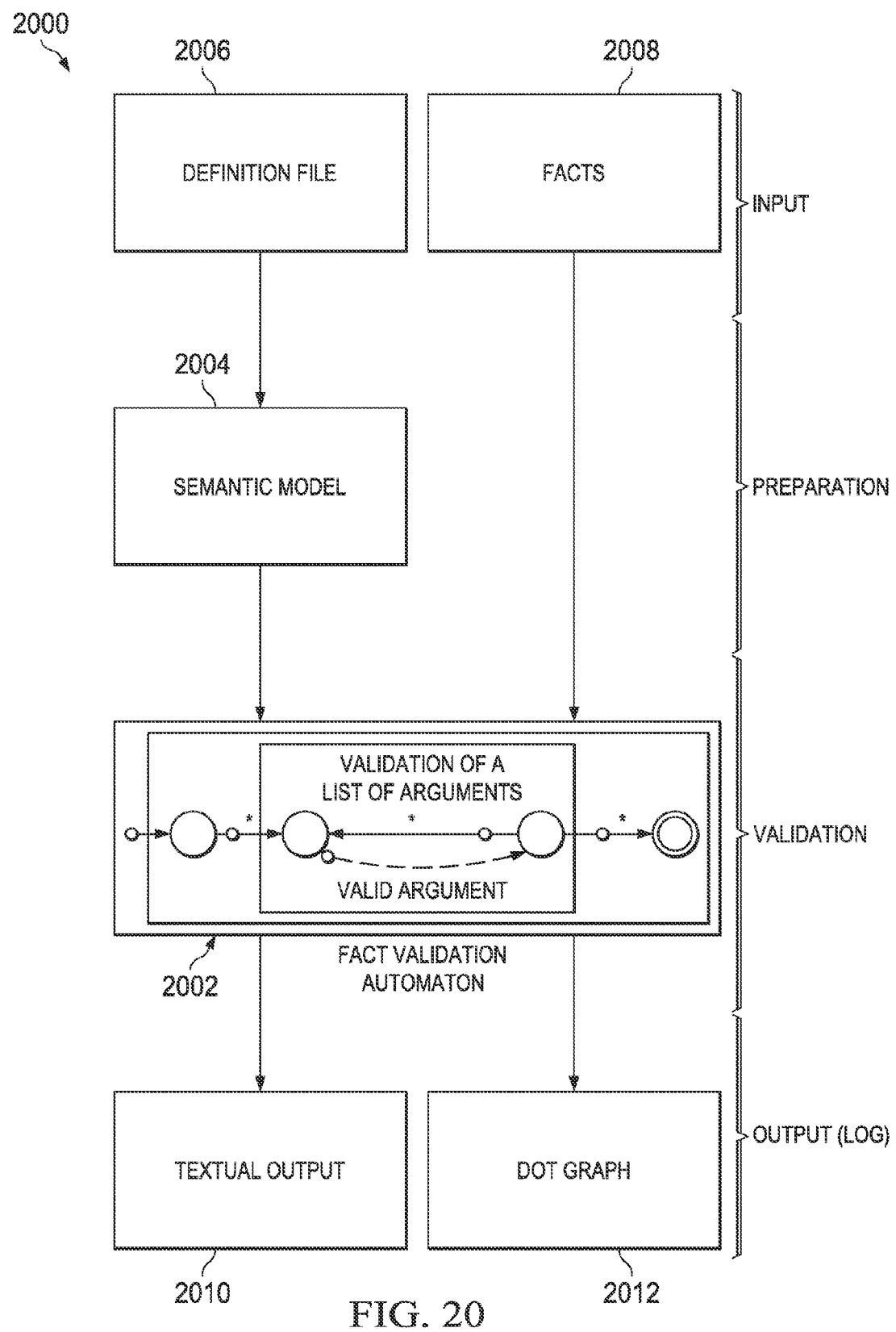
FIG. 20 is a graphical representation of an example programming model for the automaton.

The definition of the programming model, with the semantic model for validation programs that can be executed on the automata runtime, may be described. The programming model is shown in FIG. 20. FIG. 20 is a graphical representation of an example programming model 2000 for the automaton 2002. The automaton 2002 gets the facts 2008 and the definition file 2006 as inputs. A semantic model 2004 is built using the definition file 2006. Using this model, the automaton 2002 is able to validate a set of facts. The output is realized as a textual log 2010 and a dot graph 2012.

First, there are a set of inputs, which may or may not be preprocessed by the validation framework. The definition file is used to create the semantic model. It is used by the automaton that validates the given facts. At the end of the validation, there is some output which can be used to diagnose the result of the validation.

As discussed above, the definition file, written in an external domain-specific language, is used to create the semantic model. Therefore, the model has to be described in the definition file at design time. This means that the user specifies the facts, their predicates, arguments and the relationships between them. The language that the definition file is written is defined by the following grammar:

<fact predicate>[<key index>]:<argument list>.

The key index is the integer value that indicates the index of the argument in the argument list that uniquely identifies the fact. Therefore, in most cases, this will be a URI. The key index is an optional value as there are facts that do not have a single key argument, for example the runs_on fact, which can only be uniquely identified by both arguments, the systemURI and the hostURI. The key index of a fact is written in brackets ([ ]). Furthermore, the arguments in the argument list are separated by a comma (,). The definition of one argument is shown below:

<argument name>({<fact predicates that the argument depends on>}, <cardinality>)

If the argument depends on more than one fact, the predicates of the lower-level facts are separated by a comma (,). After the definition of one fact, there is a dot (.) that marks the end of the fact definition. The next fact can then be defined in the next line. Comments may be included using the number sign (#). An excerpt from the definition file is shown in Listing 1.

Listing 1 is an example excerpt from a definition file. Listing 1 shows the definition of the data_discx and the system_discx facts, as well as two comments. In the first line, there is a comment that shows that the definition of some level 0 facts will follow. In the second line, the data_discx fact is defined. Its key argument is the URI, the other three arguments are optional. Furthermore, none of the arguments depend on other facts. In the next line, there is another comment which is followed by the definition of the system_discx fact in the last line. The name of this fact is not optional as the cardinality is 1 while the description is optional. The last argument, which is the systemURI at index 2 of the argument list, is a required argument which depends on a valid and matching data_discx fact.

During the definition of the fact and argument models, there may an argument requiring a special validation procedure which has not been implemented yet. For example, the user may not only want the system name to be a non-empty string, he may also want it to be less than 255 characters long. Therefore, a new transition function (and thus a new state) has to be implemented. Such new states have to follow a strict naming scheme in order to be found and used by the validation framework. A state is a Java class that is named using the following schema:

Validate<fact predicate><argument name>

The name starts with the literal "Validate" followed by the fact predicate and the name of the argument that this state is for. For example, the name for a state that validates system names should be ValidateSystem_discxName It is very important that the fact predicate and the argument name are the ones that were defined in the definition file. In the example above, the first letters of the fact predicate and argument name are in capitalized. The reason for that is a better readability. However, the validation framework will also recognize lowercase predicates and names.

The validation programs can be logged and used for debugging purposes (in certain embodiments, in realtime). When the validation is done, the result of the validation is either successful or not. In order to analyze the validation result, the automaton facilitates logging of what it does. The following events can be logged:

1. The Beginning of the Validation of a Set of Facts;
2. The Beginning of the Validation of a Fact;
3. The Beginning of the Validation of an Argument;
4. The End of the Validation of an Argument;
5. The End of the Validation of a Fact;
6. The End of the Validation of a Set of Facts; and
7. The Occurrence of an Exception.

If any of the events mentioned above occur, the automaton calls its logger, which is the implementation of a Visitor design pattern and logs the event. As the logger has a reference to the automaton, it can access all the information needed to produce a useful log in the way the user wants the output.

There are two types of log outputs: textual and graphical. The textual output is a description of what the automaton does at the moment, i.e., which part of the validation it has just finished. For example, when an automaton validates one data fact, the output would look like the output shown in Listing 2.

Listing 2 is an example textual output of the automaton for a valid data fact. The logger logs the start of the automaton, the start of the validation of the data fact, the validation of the arguments and the end of the fact and the automaton. It also logs whether the validation of one fact and all facts was successful or not.

First, the logger logs the start of the automaton and how many facts are in the fact set to be validated. Then it logs the start of the validation of the data fact. Next, it logs the validation of the arguments and their success. After this, it logs the end of the validation of the data fact and whether it is valid or not. After all facts are validated, it logs the end of the automaton and the status of the overall validation, i.e., whether all facts are valid or not.

The second way of logging is the graphical output, which is implemented using dot graphs. In general, dot is used to "draw directed graphs as hierarchies." Therefore, it reads text files, which contain the description of the graph in a specific format, and creates drawings in different graphics formats. Listing 3 shows a text file which contains the description of a dot graph for a valid data fact.

Listing 3 is an example description of a dot graph for a valid data fact. Listing 3 includes the states and the transitions of an FVA described in dot. The digraph G in line 1 means that the graph G is supposed to be a directed graph. The braces are used to mark which parts of the graph belong together just like in any programming language. In line 2, the rankdir=LR; anticipates that the graphs are drawn from left to right. The semicolon is used to end an instruction, which is also similar to some programming languages (e.g., Java). The subgraph in line 3 expresses the creation of a new subset of nodes and edges within the main graph. In order to name the subgraph, the command label=" [ . . . ]"; is used. As a result, the entity is not labeled with its unique name, but rather with the specified label. Unlike the unique name of a graph, subgraph or node, the label does not have to be unique. For example, the label of the subgraph is defined in line 4. To assign a node to a subgraph, the node's unique name has to be written into the subgraph's body. Similar to subgraphs, nodes can also be labeled. In Listing 3, there are five nodes assigned to the subgraph. For logging, each node represents one state that the automaton was in. Edges represent the transitions of the automaton. In the textual description of the dot graph, the edges are defined at the end of the main graph. To define a directed edge between two nodes, the first node has to be written down at the beginning of the line, followed by an arrow (→). At the end of the line, there is the node the directed edge goes to, followed by the semicolon to end the command. For example, the edge between the first and the second state of the automaton is defined in line 12. After validation the argument of the data fact, the automaton goes to the next state (SkipArgumentValidation), therefore these two states were connected by an arrow.

Figure 21:
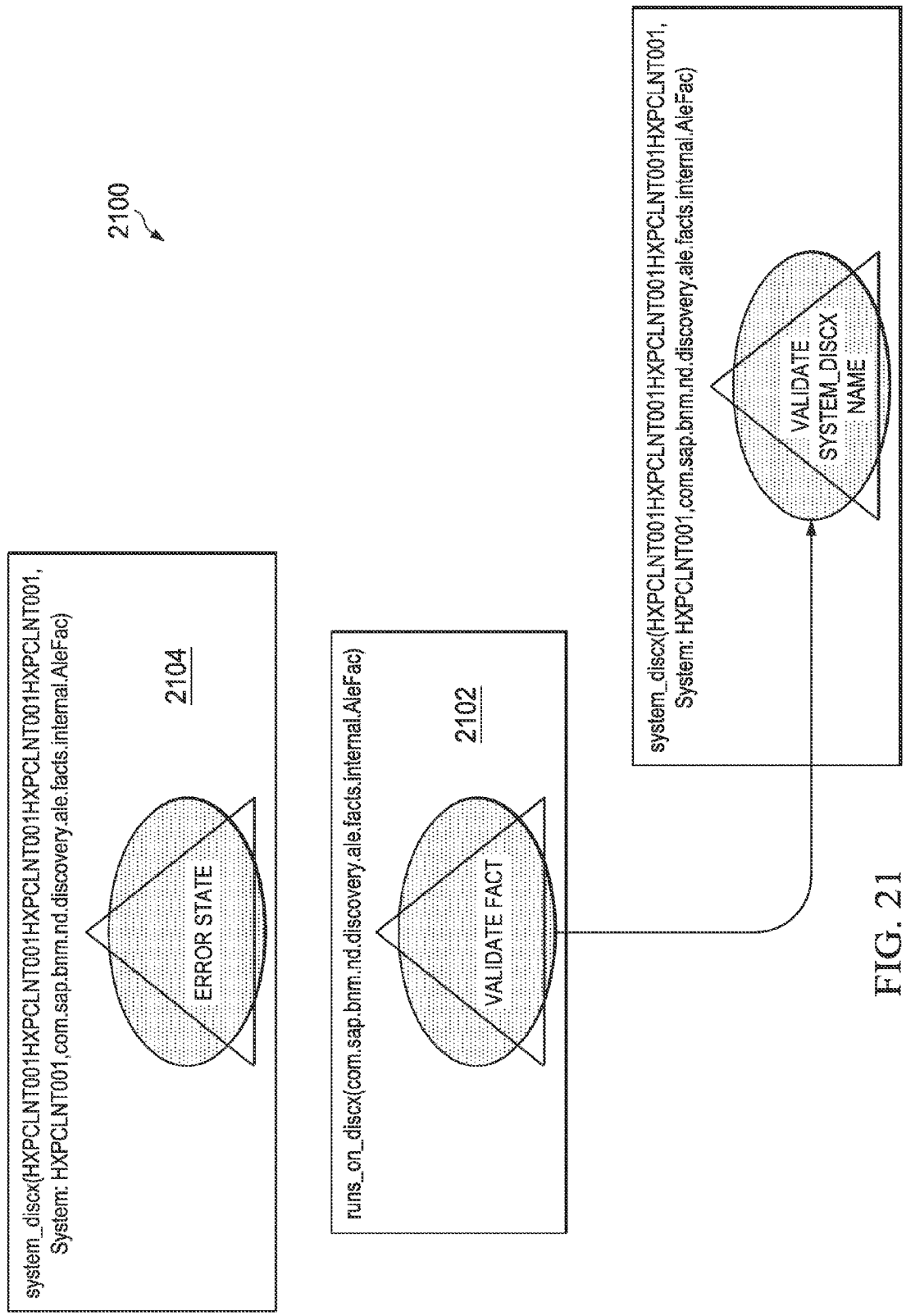
FIG. 21 is a graphical output for an example data fact.

In order to view the graph and not just the description of the graph, a graph visualization software has to be used, for example dotty, which is the dot graph viewer included in the open source software Graphviz 1. The graphical output of the dot graph defined in Listing 3 is shown in FIG. 21. FIG. 21 is a graphical output 2100 for an example data fact. For the validation of a data fact, the automaton first has to validate the dataURI and then skip the validation of three optional arguments. If no errors occur during these validations, the final state is denoted with an overlapping square.

The label of the subgraph for the data fact in line 3 of the textual description of the dot graph (Listing 3) is the label at the top of the graph. It contains the fact that has been validated. The states the automaton went through during the validation are represented by the nodes of the dot graph. As data facts have an URI, a data argument, a content type and an origin, the URI has been validated first. Therefore, the first node is called ValidateArgument. This state was logged by the logger after the automaton has finished the validation of the URI. The next three arguments of the automaton are optional, therefore the validation can be skipped. After skipping the validation of an argument, the corresponding state is logged. As soon as the automaton has finished the validation of a fact, it calls the logger which logs this event. The graphical logger analyzes whether the automaton has validated the fact successfully. If so, the final state denoted with an overlapping square. If the state the automaton is in after validating a fact is not its accepting state, the state is denoted with an overlapping triangle. Therefore it is convenient to use the dot graph to determine whether the validation was successful. If the fact to be validated is a fact whose level is higher than zero, there may be a call of an automaton in the transition function that validates the argument that is the key of another fact. In this case, the "path" the automaton went is shown with a solid arrow. The path the automaton would have gone if there was no call of another automaton is presented with a dotted arrow. For example, let there be a runs_on fact and the corresponding system and host facts, each having a corresponding data fact. Usually, in this case, the dot graph also shows which automaton was called. If the valid lower-level fact is supposed to be validated again, the automaton will skip the validation and the dot graph will show an automaton that has only one state: the accepting state (AllArgumentsValidated).

It is not only important that the automaton finds the invalid facts in a set of facts, it is also significant to find out why the facts are not valid. Therefore, the automaton logs whenever it validates a set of facts, a single fact or an argument. Until now, the validation automaton has two different possibilities to log what is does: one way of logging is textual by writing a short description what it is doing at the moment, another one is graphical by outputting a dot graph. In order to debug the automaton, both outputs can be combined in order to find the issues with the facts to be validated. To create a useful graphical output, in all cases, the top-down approach was used.

Let there be a user who tries to create a runs_on fact to be injected into the knowledge base. The user starts creating the runs_on fact by typing the predicate and the system URI argument. He then realizes that he has also to create a system fact; therefore, he stops working on the runs_on fact and starts working on the system fact instead. He has copied the system name "HXPCLNT001" from another place and pastes it into his text editor. However, the user may "accidentally" hit the paste button 47 times. That is why the system name argument includes the system name 47 times. The user also types a description and the URI of the system. The final file is shown in Listing 4. Note, that due to readability, only part of the system name is shown.

Listing 4 is an example definition file for a runs_on fact with an invalid system fact. There is a runs_on fact with a corresponding system whose name is too long. Thus, it is invalid, which causes the runs_on fact to be invalid as well. The user then starts the validation of the file. The automaton has logged the dot graph displayed in FIG. 21. There are three facts shown in FIG. 21. At first, there is a runs_on fact 2102 with a single state which is the start state of the validation automaton. Out of this state, there is a directed edge towards the start state of the automaton that was called in order to validate the corresponding system fact 2104. This means that the automaton found a corresponding system fact. However, in this example, when it tried to validate the name of the system, something went wrong. As the user does not realize that the invalid system name is the reason for the validation failure, the user looks at the textual output for this validation (see Listing 5).

Listing 5 is an example textual output of an automaton for a runs_on fact with an invalid system fact. The automaton realized that the name of the system is invalid, thus the fact is invalid. Consequently, the runs_on fact is invalid as well. As the log states, the reason for the failure of the validation is the name of the system, which exceeds the allowed length.

Consequently, the user, who has also analyzed the outputs of the automaton, fixed his error in the description file by changing the system name. The user may also forget to add a data fact for the fixed system fact, which he or she would correct for. The fixed description file is shown in Listing 6. Listing 6 is an example definition file for a runs_on fact with a corresponding system fact and no data fact.

However, this time, he made a mistake when adding the URI of the data disc as he accidentally typed a 2 as the last character of the URI instead of a 1.

Figure 22:
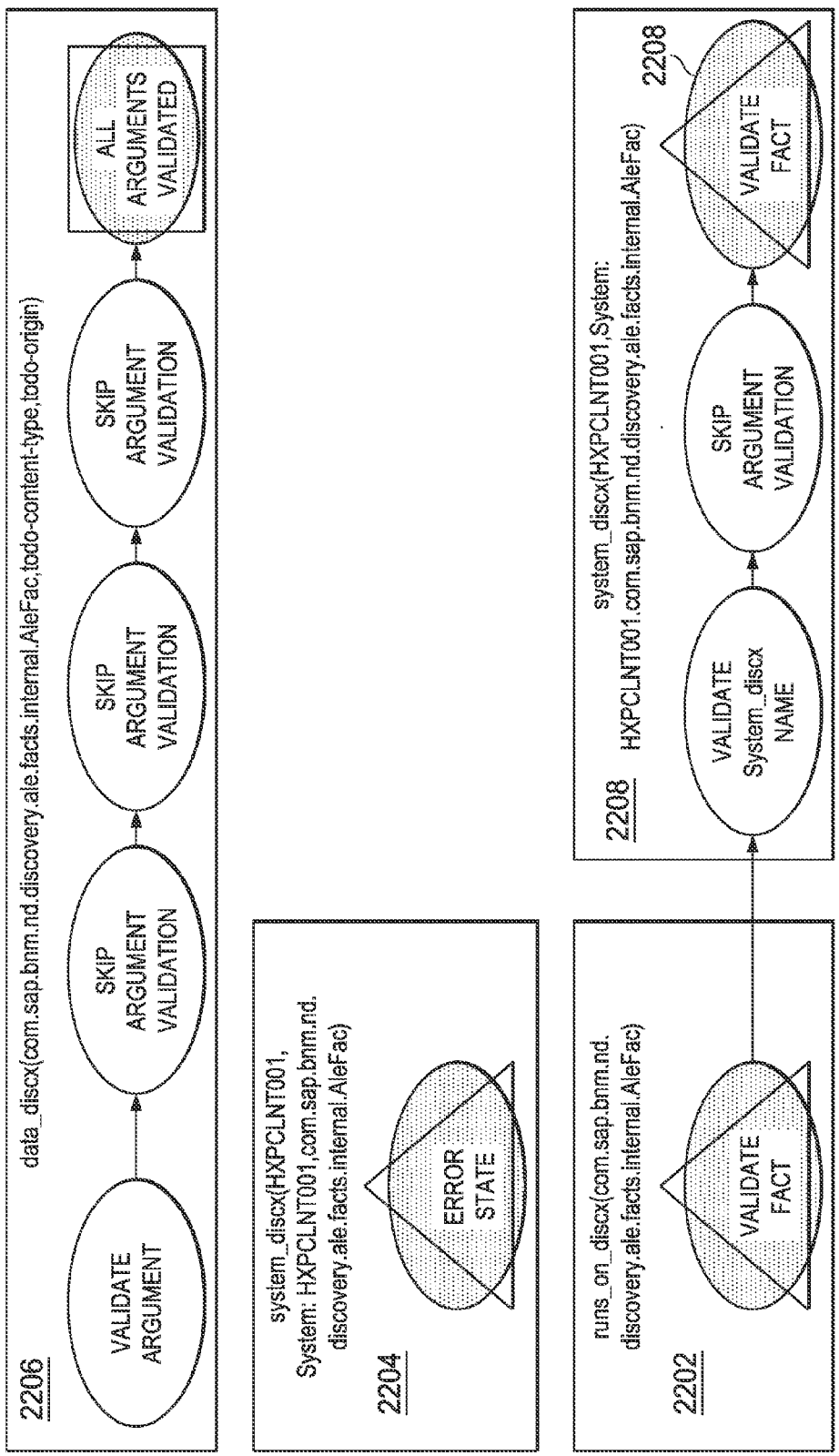
FIG. 22 is a graphical output of an example automaton for a runs_on fact whose corresponding system fact has no corresponding data fact.

The graphical output of the validation of this definition file is shown in FIG. 22. FIG. 22 is a graphical output 2200 of an example automaton for a runs_on fact 2202 whose corresponding system fact 2204 has no corresponding data fact. The automaton validating the system fact 2204 was not able to find a matching data fact even though there is a valid data fact 2206. However, this data fact's URI differs from the system URI, thus the validation is not successful. Similarly to FIG. 21, the automaton started with the validation of the runs_on fact 2202. During this validation, it called another automaton responsible for the validation of the corresponding system fact. This automaton successfully passes the state which validates the system name, thus the fix of the system name was successful. However, this time, the automaton was not able to find a data fact with the same URI as the system fact 2204, which is displayed by the automaton being stuck in the ValidateFact state 2208.

In fact, there is a data fact in this fact set and it has also been (successfully) validated; nevertheless, its URI differs from the URI of the system fact. Therefore, the automaton cannot find a relation between the two facts. This is also indicated by the textual log. This is also indicated by the textual log, which is shown in Listing 7.

Listing 7 is an example textual output of the automaton for a runs_on fact with an invalid system fact. The problem is that the corresponding system fact has no matching data fact. There is only one data fact, but it has a different URI than the system as the last characters of the URIs differ. One pertinent part of the textual output is the following one (line 6 in Listing 7):

> system_discx: Could not find a valid data discx with the same key
> systemURI: com .sap .bnm .nd. discovery .ale. facts.
> internal.                AleFactsProviderHXPCLNT001).

Figure 23:
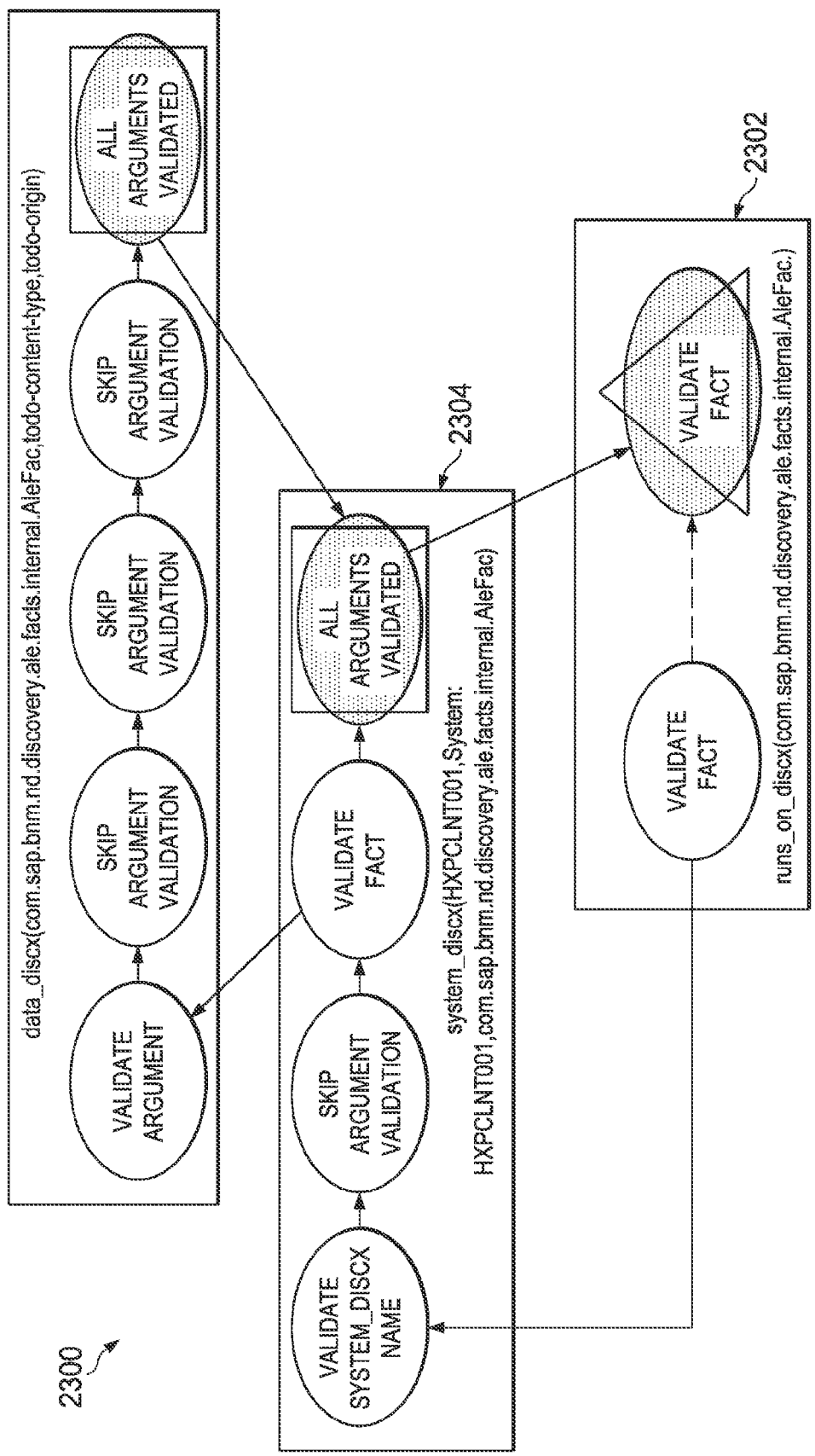
FIG. 23 is a graphical output of an example automaton for a runs_on fact whose host URI is not specified.

It shows that the automaton was not able to find a data fact with the same URI. This is the reason for the failure of the validation. Again, the user realized his mistake and changed the URI of the data fact to match the system fact. Again he lets the automaton validate the facts. The graphical output is shown in FIG. 23. FIG. 23 is a graphical output 2300 of an example automaton for a runs_on fact 2302 whose host URI is not specified. After successfully validating the system fact 2304 that matches the systemURI of the runs_on fact 2302, the automaton was not able to validate the hostURI, which was actually not specified. Therefore, the automaton stays in the (non-final) state ValidateFact. Following the directed edges in the graph, the automaton started the validation of the runs_on fact 2302. Next, it called another automaton to validate the system fact and its corresponding data fact. As these validations were successful, the control returned to the main automaton, which finally tried to validate the hostURI. Apparently, the automaton is stuck in this state. Maybe the textual output tells what the problem was with the hostURI. The complete output is shown in Listing 8.

Listing 8 is an example textual Output of the Automaton for an Invalid runs_on fact. The issue is that the host URI is not specified. The automaton was able to validate the matching system fact. When it tried to validate the hostURI of the runs_on fact, it realized that it contains an empty string. Therefore, the validation failed. The most important part of the log is shown below (line 17 in Listing 8):

runs_on_discx: No hostURI specified.

Using this output, the user changed his definition file by adding the hostURI into the runs_on fact. When he does that, he realized that he did not create a host fact yet. To prevent himself from making the same mistake again, he also creates a host fact and its corresponding data fact. The definition file then looks as shown in Listing 9. Listing 9 is an example definition file for a valid runs_on fact. There is a runs_on fact with a corresponding system and host fact that each has a matching data fact.

Figure 24:
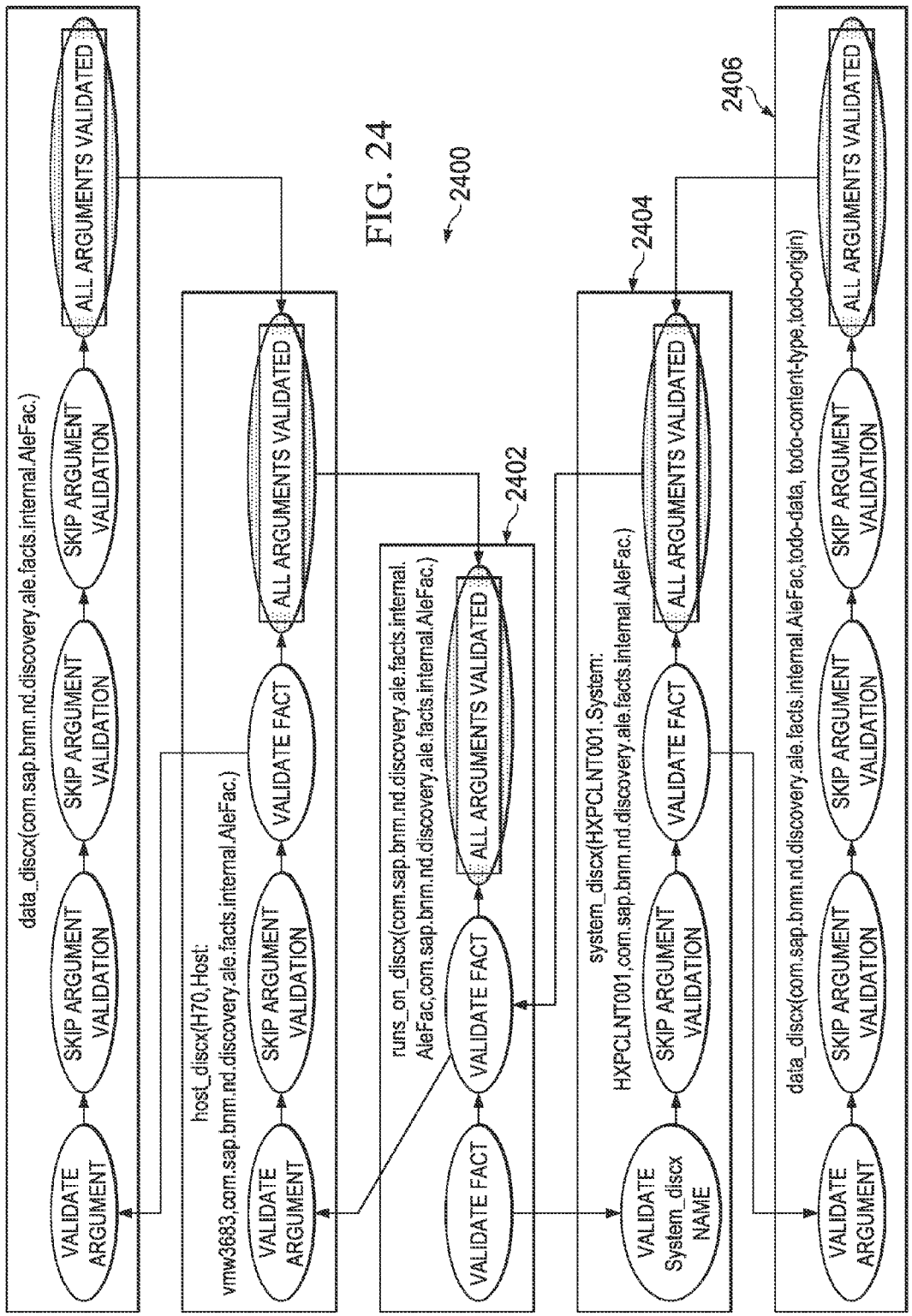
FIG. 24 is a graphical output of an example automaton for a valid runs_on fact.

The dot graph produced by the logger of the automaton is shown in FIG. 24. FIG. 24 is a graphical output 2400 of an example automaton for a valid runs_on fact 2402. The validation of the runs_on 2402, system 2404, and data 2406 facts were all successful, thus all final states are denoted with overlapping squares. In this graph, the final states of all automata are denoted with overlapping squares, which means that all facts are valid. Listing 10 is an example textual output of the automaton for a valid runs_on fact. The final message of the textual output (line 45 in Listing 10) is as follows:

Validation Successful

As all facts are valid, the validation of the fact set is successful. Therefore, the user was able to inject the facts he created.

In general, if the set of facts is very small (as in the examples above), it is a good idea to first have a look at the dot graph in order to gain an overview of the validation. If there are any states marked red, the textual log can be helpful as is give a more detailed description of the error. If there is a bigger fact set, it is better to have a look at the last line of the textual output first. It will tell whether the validation of the fact set was successful. If it is not, the graphical output helps to find the state that the validation automaton got stuck. If this information does not help either, there is still the detailed textual log, which contains information of the success of the validation of each argument. Consequently, a combination of the graphical and the textual output can be used to debug the automaton and therefore find the reason for a possible failure of the validation.

Figure 25:
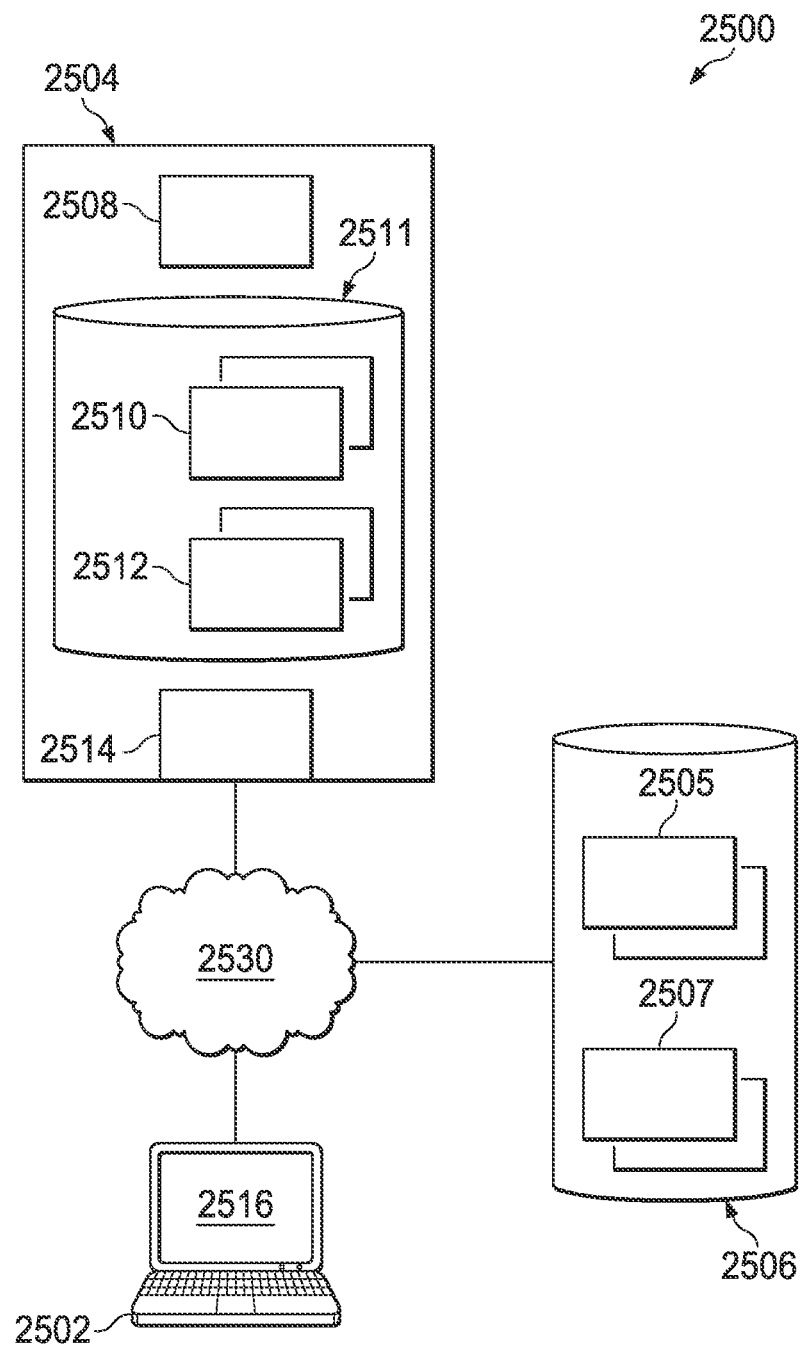
FIG. 25 is a schematic representation of an example system level environment for content-based validation of knowledge.

FIG. 25 is a schematic representation of an example system level system 2500 for content-based validation of knowledge. FIG. 25 illustrates an example trading environment system 2500. The system 2500 may include the marketplace management environment. In one embodiment, the system 2500 may include a server 2504 coupled to one or more clients 2502, such a retailer, suppler, customer, bank, etc., at least some of which communicating across network 2530. Client 2502 includes an electronic computing device operable to receive, transmit, process, and store data associated with system 2500. It will be appreciated that FIG. 25 provides merely one example of computers that may be used with the disclosure, and, as such, each illustrated computer is generally intended to encompass any suitable processing device. For example, although FIG. 25 illustrates one server 2504, the system 2500 can be implemented using computers other than servers, as well as a server pool. Indeed, the system 2500 may be any computer or processing device such as, for example, a blade server, general-purpose personal computer (PC), Macintosh, workstation, Unix-based computer, or any other suitable device. In other words, the present disclosure contemplates computers other than general purpose computers including computers without conventional operating systems. The system 2500 may be adapted to execute any operating system including Linux, UNIX, Windows Server, or any other suitable operating system. According to one embodiment, the system 2500 may also include or be communicably coupled with a web server and/or a mail server.

As illustrated, the system 2500 may be communicably coupled with a remote repository 2506. The repository 2506 may include one or more persistent storage devices (e.g., hard drives, etc.) that form a storage backbone for the system 2500. The repository 2506 may include any intra-enterprise, inter-enterprise, regional, nationwide, or substantially national electronic storage facility, data processing center, or archive. In another embodiment, the repository 2506 may include one or more hard disk drives, semiconductor memories, and the like that are coupled, either internally or externally, to the system 2500 via a direct connection, such as an integrated drive electronics (IDE) connection, a small computer systems interface (SCSI) connection, a Serial ATA (SATA) connection, or other suitable communicable connection.

The repository 2506 may be a central database communicably coupled to the system 2500 via a virtual private network (VPN), Secure Shell (SSH) tunnel, or other secure network connection. The repository 2506 may be physically or logically located at any appropriate location including in one of the example enterprises or off-shore, so long as it remains operable to store information associated with system 2500 and communicate such data to the system 2500. For example, the repository 2506 may comprise a data store or warehouse.

The repository 2506 allows for the system 2500 and/or one or more the trading participants to dynamically store and retrieve instructions 2505 or facts 2507 from the repository 2506. For example, the instructions 2505 may include code that when executed by the system 2500 generate validation programs from semantic models 2512. The instructions 2505 may include code that is web-executable (e.g., java code) over the network 2530. For example, client system 2502 may execute code from the instructions 2505 over the network 2530. Facts 2507 may be generated that may be subjected to validation. Repository 2506 may be a cloud based memory. It may be a distributed memory accessed across network 2530. Repository 2506 may be a shared memory, like that shown in FIG. 19.

The instructions 2505 may include software, firmware, wired or programmed hardware, or any combination thereof as appropriate. Indeed, the instructions 140 may be written or described in any appropriate computer language including C, C++, Java, J#, Visual Basic, assembler, Perl, any suitable version of 4GL, as well as others. For example, the instructions 140 may be implemented as Enterprise Java Beans ("EJBs") or the design-time components may have the ability to generate run-time implementations into different platforms, such as J2EE (Java 2 Platform, Enterprise Edition), ABAP (Advanced Business Application Programming) objects, or Microsoft's .NET. Further, while illustrated as being internal to the repository 2506 and/or the system 2500, one or more processes associated with the instructions may be stored, referenced, or executed remotely. For example, a portion of instructions 2505 may create a web service that is remotely called (e.g., by the retailer system), while another portion of instructions 2505 may be an interface object bundled for processing at a client (e.g., one of the trading participants). In another example, the majority of the instructions may also reside—or their processing take place—on one of the trading participants. Moreover, the instructions 2505 may be a child or sub-module of another software module or enterprise application (not illustrated) without departing from the scope of this disclosure.

The repository 2506 may store also store facts 2510. The facts 2510 may include any business, enterprise, application or other transaction data and metadata involving the trading participants. For example, the facts 2510 may include purchase histories, purchase trend information, entries in the master catalog, business profiles, other business attributes, and/or the business ratings, as described above, as well as other suitable marketplace related data. As such, the system 2500 may mine the repository 2506 for the information needed used identify matches (i.e., new potential relationships) between the trading participants.

The system 2500 may also include a processor 2508. The processor 2508 executes instructions and manipulates data to perform the operations of the system 2500. In various configurations, the processor 2508 may be, for example, a central processing unit ("CPU"), a blade, an application specific integrated circuit ("ASIC"), a field-programmable gate array ("FPGA"), or other suitable logic device. Although FIG. 25 illustrates a single processor 2508 in system 2500, multiple processors may be used according to particular needs and reference to processor 2508 is meant to include multiple processors where applicable.

The system 2500 also includes local memory 2511. As illustrated, the memory 2511 may include instructions 2512 and facts 2510, which may each be a subset of the instructions 2505 and the facts 2507. As those of ordinary skill in the art will appreciate, the instructions 2512 and facts 2510 may be copied over to the memory prior to being executed or manipulated by the processor 2508. The memory 2511 may include any memory or other computer readable storage module and may take the form of volatile or non-volatile memory including, without limitation, magnetic media, optical media, random access memory ("RAM"), read-only memory ("ROM"), removable media, or any other suitable local or remote memory component. The memory 2511 may be internally or externally coupled to the system 2500.

The system 2500 may also include interface 2514 for communicating with other computer systems, such as the other trading participants, over the network 2530. In certain embodiments, the system 2500 receives data from internal or external senders through the interface 2514 for storage in the memory 2511, for storage in repository 2506, and/or for processing by processor 2508. Generally, the interface 2514 comprises logic encoded in software and/or hardware in a suitable combination and operable to communicate with network 2530. More specifically, the interface 2514 may comprise software supporting one or more communications protocols associated with the network 2530 or hardware operable to communicate physical signals.

The network 2530 facilitates wireless or wireline communication between the system 2500 and any other local or remote computer, such as the trading participants. The network 2530 may be all or a portion of an enterprise or secured network. In another example, network 2530 may be a VPN merely between one or more of the trading participants across a wireline or wireless link. Such an example wireless link may be via 802.11a, 802.11b, 802.11g, 802.11n, 802.20, WiMax, and many others. While illustrated as a single or continuous network, network 2530 may be logically divided into various sub-nets or virtual networks without departing from the scope of this disclosure, so long as at least portion of network 2530 may facilitate communications between system 2500 and at least one of the trading participants.

The network 2530 encompasses any internal or external network, networks, sub-network, or combination thereof operable to facilitate communications between various computing components in system 2500. Network 2530 may communicate, for example, Internet Protocol ("IP") packets, Frame Relay frames, Asynchronous Transfer Mode ("ATM") cells, voice, video, data, and other suitable information between network addresses. Network 2530 may include one or more local area networks ("LANs"), radio access networks ("RANs"), metropolitan area networks ("MANs"), wide area networks ("WANs"), all or a portion of the global computer network known as the Internet, and/or any other communication system or systems at one or more locations. In certain embodiments, network 2530 may be a secure network associated with the enterprise and certain local or remote clients.

Client 2502 may include any computing device operable to connect or communicate with the system 2500 or the network 2530 using any communication link. At a high level, each of the trading participants may include or execute at least a graphical user interface ("GUI") 2516 and comprise an electronic computing device operable to receive, transmit, process and store any appropriate data associated with system 2500. For ease of illustration, each of the trading participants is described in terms of being used by one user. But this disclosure contemplates that many users may use one computer or that one user may use multiple computers. In certain situations, users may include owners, bookkeepers, as well as third party or outside accountants.

The GUI 2516 comprises a graphical user interface operable to allow the user of client 2502 to interface with at least a portion of system 2500 for any suitable purpose, such as viewing application or other transaction data. Generally, GUI 2516 provides the particular user with an efficient and user-friendly presentation of data provided by or communicated within system 2500. The GUI 2516 may comprise a plurality of customizable frames or views having interactive fields, pull-down lists, and buttons operated by the user. For example, the GUI 2516 is operable to display certain elements, such as graphical and/or textual outputs of the validation process. The GUI 2516 may also present a plurality of portals or dashboards. For example, GUI 2516 may display a portal that allows users to view, create, and manage validation program modeling and validation debugging. It will be understood, however, that the GUI 2516 contemplates any graphical user interface, such as a generic web browser or touch-screen, which processes information in system 2500 and efficiently presents the results to the user. The GUI 2516 can accept data from the system 2500 or the trading participants via the web browser (e.g., Microsoft Internet Explorer or Netscape Navigator) and return the appropriate HTML or XML responses using network 2530.

Figure 26:
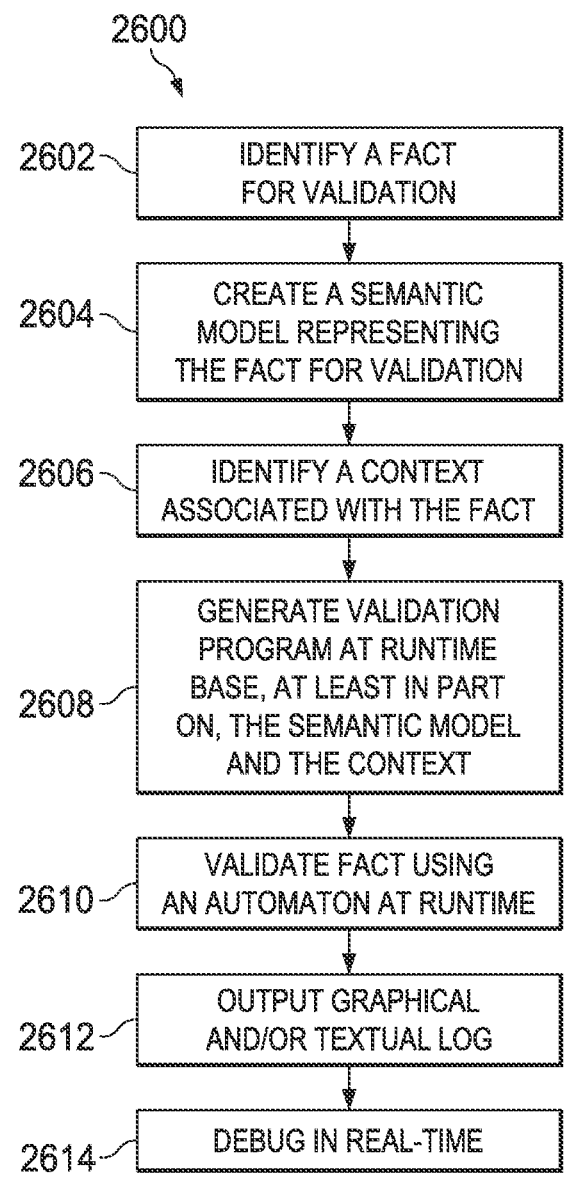
FIG. 26 is a process flow chart for validating a fact.

FIG. 26 is a process flow chart 2600 for validating a fact. A fact for validation may be identified (2602). A semantic model representing the fact may be created (2604). A context associated with the fact can be identified (2606). A validation program can be generated from the semantic model, the semantic model in a domain specific language (2608). The validation program facilitating the generation of automaton at runtime from the semantic model validates the fact (2610). A graphical and/or textual log of the validation can be outputted (2612). The graphical and/or textual log can be used for real-time debugging (2614).

A number of embodiments of the invention have been described. Nevertheless, it will be understood that various modifications may be made without departing from the spirit and scope of the invention. For example, a target model different from the consolidated model can be used. Another runtime/validation program incarnation can be used. That is, a SAT solver or other non-automaton based implementation can be used. In addition, other ways of defining automata are contemplated. For example, automata may be non-embedded, such as chained automata. Different output methods may be used for the debugging process. Different ways of representing the validation program than external DSL are also contemplated, such as internal DSL and fluent API. In addition, the disclosure contemplates an individually owned semantical model. Accordingly, other embodiments are within the scope of the following claims.

What is claimed is:

1. A computer implemented method for knowledge validation, the method comprising:
    identifying a fact for validation;
    creating a semantic model, the semantic model representing the fact for validation;
    identifying a context associated with the fact, wherein the fact to be validated is a subset of the context;
    creating an automaton based at least in part on the identified context; and
    validating the fact using the automaton.

2. The computer implemented method of claim 1, further comprising identifying a consolidated model, the consolidated model including information about business trading networks within and between companies, the fact for validation associated with the consolidated model.

3. The computer implemented method of claim 1, wherein the automaton is a deterministic finite automaton.

4. The computer implemented method of claim 3, wherein the deterministic finite automaton is derived from an epsilon non-deterministic finite automaton.

5. The computer implemented method of claim 3, wherein the deterministic finite automaton is defined by one or more of a state, an input symbol, a transition function, a starting state, and a final state.

6. The computer implemented method of claim 5, wherein the final state is an accepting state, the automaton entering the accepting state after successfully validating the fact.

7. The computer implemented method of claim 1, wherein the automaton is created based, at least in part on, the semantic model.

8. The computer implemented method of claim 1, wherein the semantic model further represents fact dependencies associated with the fact.

9. The computer implemented method of claim 1, wherein creating the automaton based at least in part on the identified context comprises creating an automaton for each instance of a model entity.

10. The computer implemented method of claim 1, wherein the fact is a Datalog fact.

11. The computer implemented method of claim 1, wherein the fact is one or more of a fact, knowledge, or data.

12. The computer implemented method of claim 1, further comprising providing a runtime graphical output identifying error states.

13. The computer implemented method of claim 1, further comprising providing a runtime textual log output identifying errors.

14. The computer implemented method of claim 1, wherein validating the fact using the automaton includes validating one or more of structure or content of structured data.

15. The computer implemented method of claim 1, wherein a domain specific language is used for a programming model to specify a validation program.

16. The computer implemented method of claim 1, wherein a validation program is generated from the semantic model, the semantic model in a domain specific language, and the automaton is generated at runtime from the semantic model.

17. The computer implemented method of claim 16, wherein the automaton is generated automatically by an intelligent algorithm.

18. The computer implemented method of claim 1, wherein the fact is a fact in a consolidation model, the consolidation model subject to validation by the automaton.

19. A non-transitory computer-readable medium storing instructions executable by one or more processors to perform operations comprising:
    identifying a fact for validation;
    creating a semantic model, the semantic model representing the fact for validation;
    identifying a context associated with the fact;
    creating an automaton based at least in part on the identified context, wherein the automaton is a deterministic finite automaton; and
    validating the fact using the automaton.

20. A system comprising:
    one or more processors; and
    a computer-readable medium storing instructions executable by data processing apparatus to perform operations comprising:
        identifying a fact for validation, wherein the fact is one or more of a fact, knowledge, or data;
        creating a semantic model, the semantic model representing the fact for validation;
        identifying a context associated with the fact;
        creating an automaton based at least in part on the identified context; and
        validating the fact using the automaton.

* * * * *